United States Patent [19]
Nakamura et al.

[11] Patent Number: 6,005,987
[45] Date of Patent: Dec. 21, 1999

[54] PICTURE IMAGE FORMING APPARATUS

[75] Inventors: Mitsuaki Nakamura, Tenri; Yoshihiro Kitamura, Osaka; Hiroshi Akagi, Nara, all of Japan

[73] Assignee: Sharp Kabushiki Kaisha, Osaka, Japan

[21] Appl. No.: 08/951,713

[22] Filed: Oct. 16, 1997

[30] Foreign Application Priority Data

Oct. 17, 1996 [JP] Japan ..................................... 8-274326
Oct. 2, 1997 [JP] Japan ..................................... 9-269427

[51] Int. Cl.⁶ ........................................................ G06K 9/32
[52] U.S. Cl. ......................... 382/294; 382/154; 382/284; 382/300; 348/42; 348/50; 348/222; 348/565
[58] Field of Search ................................... 382/294, 154, 382/300, 178, 284, 285, 282, 293, 296; 345/114, 419; 348/42, 50, 49, 185, 189, 190, 222, 399, 565

[56] References Cited

U.S. PATENT DOCUMENTS

| | | | |
|---|---|---|---|
| 3,646,336 | 2/1972 | Hobrough | 708/814 |
| 4,602,857 | 7/1986 | Woltz et al. | 352/84 |
| 5,227,832 | 7/1993 | Kawasaki et al. | 354/402 |
| 5,444,478 | 8/1995 | Lelong et al. | 348/39 |
| 5,631,697 | 5/1997 | Nishimura et al. | 348/172 |
| 5,644,414 | 7/1997 | Kato et al. | 359/22 |
| 5,650,814 | 7/1997 | Florent et al. | 348/39 |
| 5,703,961 | 12/1997 | Rogina et al. | 382/154 |
| 5,726,703 | 3/1998 | Izawa et al. | 348/46 |
| 5,764,871 | 6/1998 | Fogel | 395/127 |
| 5,825,915 | 10/1998 | Michimoto et al. | 382/154 |

FOREIGN PATENT DOCUMENTS

| | | |
|---|---|---|
| 0605045A1 | 7/1994 | European Pat. Off. . |
| 0650299A1 | 4/1995 | European Pat. Off. . |
| 3-182976 | 8/1991 | Japan . |
| 5-122606 | 5/1993 | Japan . |
| WO 98/34195 | 8/1998 | WIPO . |

OTHER PUBLICATIONS

J.R. Müller et al., Adaptive–complexity registration of images, Proc. Comp.Soc. Conf. on Comp. Vision and Pattern Recognition, 953 (1994).

Shenchang E. Chen, "QuickTime® VR—An Image–Based Approach to Virtual Environment Navigation", Computer Graph. Proc., 29 (1995).

*Primary Examiner*—Leo H. Boudreau
*Assistant Examiner*—Kanji Patel
*Attorney, Agent, or Firm*—Dike, Bronstein, Roberts & Cushman, LLP; David G. Conlin; William J. Daley, Jr.

[57] ABSTRACT

In forming a panoramic picture image by compositing picture images dividedly imaged, the invention corrects deviations of images of an object at overlap regions caused by a difference in fields of view of imaging means or movement of an object to be imaged in which a picture image forming apparatus includes a picture image inputting device, a frame memory for storing divided picture images inputted from the picture image inputting device, a picture image position calculating unit for calculating positions of compositing the divided picture images, a picture image parallax sampling and processing unit for sampling parallax information among picture images from picture images including parallaxes in the overlap regions among contiguous divided picture images, an intermediate picture image forming and processing unit for forming a plurality of intermediate picture images from the picture images including the parallaxes and a picture image composition and processing unit for compositing a panoramic picture image from the divided picture images where the deviations of images in the overlap regions are corrected by the picture image parallax sampling and processing unit and the panoramic picture images are composited performing an interpolation by the intermediate picture images formed by the intermediate picture image forming and processing unit.

12 Claims, 12 Drawing Sheets

INTERPOLLATION

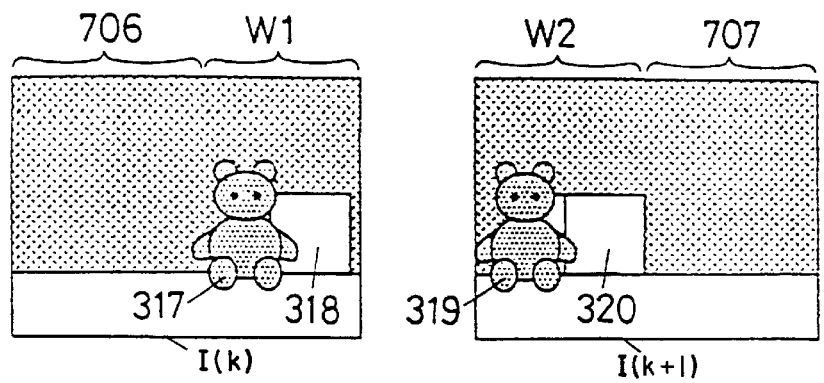
FIG. 8A
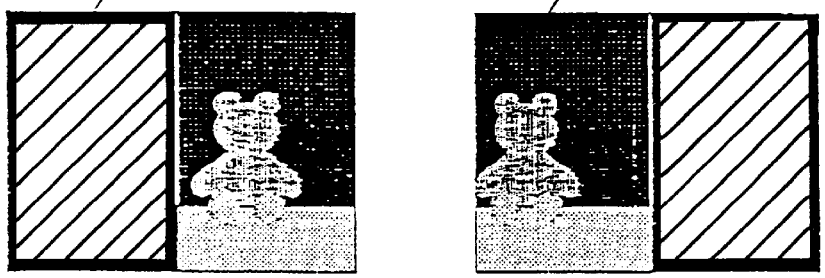
FIG. 8B
FIG. 8C
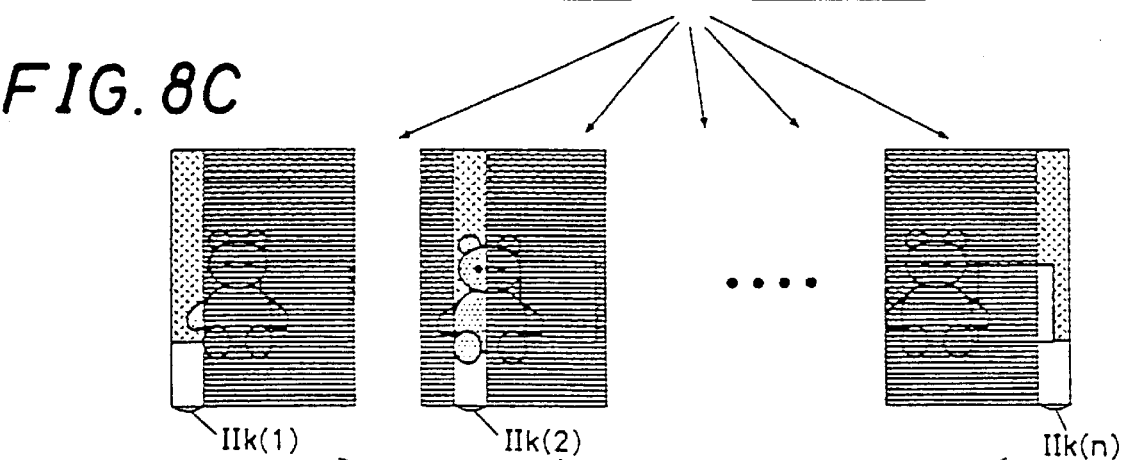
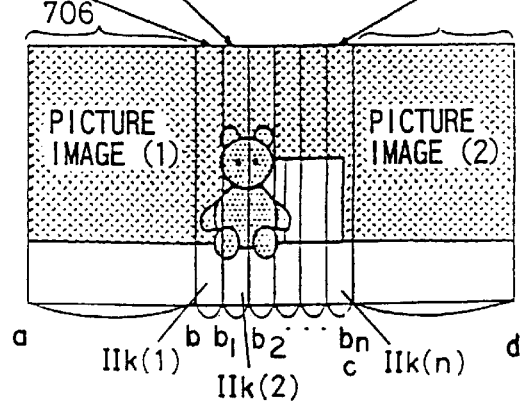
FIG. 8D

PICTURE IMAGE FORMING APPARATUS

BACKGROUND OF THE INVENTION

1. Field of the Invention

The present invention relates to a picture image forming apparatus for forming a composite panoramic picture image from a plurality of still digital picture images.

2. Description of the Related Art

There are known methods for jointing a pair of digital picture images including images of a same object and having overlap regions where the plurality of digital picture images overlap each other, to form a panoramic picture image or a highly fine (high resolution) picture image, for example, a method disclosed in Japanese Unexamined Patent Publication JP-A 3-182976(1991), in which two characteristic particles which are granular portions having high concentration in picture image, are sampled in each of a pair of picture images having overlap regions and the picture images are jointed together with a line connecting these as a joint line, and a method disclosed in Japanese Unexamined Patent Publication JP-A 5-122606(1993), in which the pair of picture images are jointed together at a region minimizing a difference in concentration.

There is disclosed a method described in "Picture Image Analysis Handbook", page 466, issued by Tokyo University Publication Association where in jointing a pair of picture images, the picture images are not jointed by a line such as a joint line but color tone is smoothed such that a change in concentrations of the two picture images does not become discontinuous at surroundings of the joint line.

A camera is supposed to provide a picture image describing a view in a imaging range by one imaging operation. In imaging a digital picture image by using the camera, there are a case where pan-imaging by hand holding is carried out, a case where pan-imaging is carried out by using a tripod, a case where imaging is performed by installing a plurality of cameras having overlapped imaging ranges.

Pan-imaging indicates plural times of imaging operation where the imaging range of a camera is moved in the horizontal direction where at each imaging operation, portions of an object are included in the imaging range in performing preceding or succeeding imaging operation.

For example, as shown by FIG. 4, cameras 301 and 302 capable of imaging an object included in imaging ranges 307 and 308 each having a predetermined size by one imaging operation, are arranged such that the imaging ranges 307 and 308 overlap, to image objects 309 and 310. In this case, optical axes 303 and 304 of lenses 301a and 302a of the cameras intersect with each other by making an angle 305. In FIG. 4, a portion 311 where the imaging ranges 307 and 308 overlap is indicated by attaching hatched lines. The objects 309 and 310 are disposed in the portion 311. Distances (hereinafter, referred to as depth) from the camera 301 to the objects 309 and 310 differ from the depths from the camera 302 to the objects 309 and 310, respectively. Overlapped states of the objects 309 and 310 differ in view from the cameras 301 and 302 and therefore, a portion 321 of the object 310 is not seen from the camera 301 and seen from the camera 302.

FIGS. 5A and 5B show picture images 313 and 314 obtained by the cameras 301 and 302 through the imaging operation. The picture image 313 includes object images 317 and 318 representing the objects 309 and 310. The picture image 314 includes object images 319 and 320 of the objects 309 and 310.

Alternately, only one camera may be arranged in the same manner as in the camera 301 of FIG. 4. First the objects 309 and 310 are imaged by the camera, and then the camera is moved from the position where the optical axis of the lens coincides with the optical axis 303, to the position where the optical axis of the lens coincides with the optical axis 304, to image the objects 309 and 310 at the latter position. In this case, the positional relationship between the camera and the objects 309 and 310 in the first imaging operation equal to that between the camera 301 and the objects 309 and 310, and the positional relationship between the camera and the objects 309 and 310 in the second imaging operation is equal to that between the camera 302 and the objects 309 and 310. Consequently two picture images obtained in this case are equal to two picture images obtained by the cameras 301 and 302.

In carrying out pan-imaging by hand holding or imaging by a plurality of cameras, positions of the lenses 301a and 302a of the cameras 301 and 302 are shifted as shown by FIG. 4. Further, in many of combinations of camera and tripod, the rotational center of a camera does not coincide with the lens center of the camera and accordingly, more or less movement of the position of lens is caused even in the case where pan-imaging is carried out by using a tripod. These differences in the position of lens give rise to a parallax caused by a difference in depths of objects in the picture image.

For example, as shown by FIGS. 5A and 5B, although the portion 321 is imaged in the image 320 of the object 310 in the picture image 314, the portion 321 is not imaged in the image 318 of the object 310 in the picture image 313. Therefore, according to the picture images 313 and 314, respective shapes and overlapped states of the images 317, 318; 319, 320 of the objects 309 and 310 in the overlapped portion 311 of the imaging ranges 307 and 308 do not coincide with each other.

Accordingly, when a panoramic picture image 323 shown by FIG. 5C is formed by jointing the picture images 313 and 314 such that the positions of the picture images 313 and 314 are made to coincide with each other in order to make the images 317 and 319 of the object 309 coincide with each other, the images 318 and 320 of the object 310 do not coincide with each other but are shifted from each other. Conversely, when a panoramic picture image 324 shown by FIG. 5D is formed by jointing the picture images 313 and 314 such that the positions of the picture images 313 and 314 are made to coincide with each other in order to make the images 318 and 320 of the object 310 coincide with each other, the images 317 and 319 of the object 309 do not coincide with each other but are shifted from each other. Further, when a moving body is an object, in the case where respective imaging operations are shifted over time, with the movement of the body the position and the shape of the image of the object are changed in the respective picture images and therefore, the images of the object do not coincide with each other also in the case where a panoramic picture image is formed from these picture images as described above.

Further, according to the conventional picture image jointing technology, picture images are jointed by a joint line of a straight line or a straight line having a width. However, when there are differences among picture images as described above, picture images cannot often be composited adequately. Particularly, even when portions of picture images are naturally jointed, there causes shift or doubled imaging on joint lines in respect of portions resulting in parallax or including a moving body thereby causing significant deterioration in the quality of a panoramic picture image.

SUMMARY OF THE INVENTION

In order to resolve the above-mentioned problems of the conventional technology, it is an object of the invention to provide a picture image forming apparatus in which in imaging a scene by a camera or the like, in the case where movement of the lens center of the camera is unavoidable, picture images taken by the camera, including a parallax caused by a difference in depth of an object are composited to obtain a composite picture image having inconsiderable deterioration in picture image quality caused by a shift in the image of the object or doubled imaging of images of the object.

Further, it is an object of the invention to provide a picture image forming apparatus whereby in imaging a scene by a camera or the like, in the case where movement of the lens center of the camera is unavoidable, or in the case an object of a moving body is unavoidable, picture images having parallax caused by a difference in depth or including an image of a moving body are composited thereby obtaining a composite picture image having inconsiderable deterioration of picture image quality caused by a shift in the image of an object or doubled imaging of images of the object.

A first aspect of the invention provides a picture image forming apparatus comprising:

imaging means for obtain a pair of divided picture images having a parallax by imaging an object and a periphery of the object so as to include a same part of the object in imaging regions for the pair of divided picture images;

calculating means for calculating overlap regions of the respective divided picture images including the images of the object, parallax sampling means for sampling the parallax from the images of the object in the two overlap regions, intermediate picture image forming means for forming intermediate picture images to be provided by imaging the object from points between the observing points from which the respective divided picture images are imaged on the basis of the images of the object in the overlap regions of the pair of divided picture images and the sampled parallax, and picture image composition means for providing a composite picture image by interpolating the parallax of the images of the object in the two overlap regions by the intermediate picture images and compositing the pair of divided picture images such that the overlap regions overlap.

According to the first aspect of the invention, the parallax caused by the depth of the object is calculated based on the images of the object in the overlap regions of the divided picture images and the images of the object in the overlap regions are interpolated by using the intermediate picture images for interpolating the positions of imaging the picture images based on the calculation thereby achieving an effect capable of forming a panoramic picture image that is more natural than in the conventional technology even in the case where the parallax is caused by the depth of the object.

A second aspect of the invention provides a picture image forming apparatus wherein, when there are a plurality of objects having different distances from the imaging means to the objects, the parallax sampling means corrects parallaxes of images of the respective objects such that the parallax of the image of any one of the objects among the parallaxes sampled from the images of the respective objects, is nullified.

According to the second aspect of the invention, the parallax sampling means corrects the sampled parallaxes as described above. Thereby, when the parallaxes of the images of the objects in the two overlap regions are interpolated by using the intermediate picture images formed on the basis of the parallaxes and the pair of divided picture images are composited, in the composite picture image, the images of any one of the objects are jointed naturally. Accordingly, a more natural composite picture image can be obtained.

A third aspect of the invention provides a picture image forming apparatus wherein the intermediate picture image forming means of the picture image forming apparatus forms a plurality of the intermediate picture images and the respective intermediate picture images are provided with observing points different from each other to provide the respective intermediate picture images by imaging the object.

According to the third aspect of the invention, the intermediate picture image forming means forms a plurality of the intermediate picture images as described above. The picture image composition means interpolates the parallaxes of the images of the object in the two overlap regions by using the plurality of intermediate picture images. Thereby, since differences in parallax of the images of the plurality of objects in the respective overlap regions are further alleviated than in the case of forming one intermediate picture image, a further natural composite picture image can be obtained. The more the number of intermediate picture images, the more a difference in parallax can be lowered.

A fourth aspect of the invention provides a picture image forming apparatus wherein the calculating means of the picture image forming apparatus calculates differences in angle of the images of the object in the two divided picture images and subjects the divided picture images to a rotational transformation such that the calculated differences of the angles cancel each other.

According to the fourth aspect of the invention, the calculating means corrects to rotate the divided picture images as described above. Thereby, even in the case where not only the differences in the parallaxes but the differences in angle of the images of the object are included in the divided picture images, the differences are corrected and accordingly, the picture images can be composited further finely.

A fifth aspect of the invention provides a picture image forming apparatus, wherein the calculating means of the picture image forming apparatus calculates differences in size of the images of the object in the divided picture images and the two divided picture images are magnified or reduced such that the calculated differences in size cancel each other.

According to the fifth aspect of the invention, the calculating means corrects to magnify or reduce the divided picture images as described above. Thereby, even when the divided picture images include not only the differences in the parallaxes but differences in size of the images of the object, the differences are corrected and accordingly, the picture images can be composited further finely.

A sixth aspect of the invention provides a picture image forming apparatus wherein the calculating means calculates differences in angle and size of the images of the object in the two divided picture images and subjects the divided picture images to rotational transformation and magnification or reduction such that the calculated differences in angle and size cancel each other, respectively.

According to the sixth aspect of the invention, the calculating means, as mentioned above, corrects to rotationally transform and magnify or reduce the two divided picture images. Thereby, even when the divided picture images include not only the differences in parallax but also differences in angle and size of the images of the object, the differences are corrected, and accordingly the picture images can be composited further finely.

A seventh aspect of the invention provides a picture image forming apparatus comprising imaging means 101 for providing a pair of divided picture images having parallaxes in images of objects by imaging the same objects respectively from two different observing points, calculating means for calculating overlap regions including the images of the objects in the respective divided picture images, parallax sampling means for sampling the parallaxes from the images of the objects in the overlap regions, joint line setting means for setting joint lines on a profile of the image of one of the objects most proximate to the imaging means in the respective overlap regions based on the sampled parallaxes, and picture image composition means for providing a composite picture image by compositing the pair of divided picture images such that the set joint lines overlap.

According to the sixth aspect of the invention, the parallax caused by the depth of the object or a shift in position of the image of a moving object in the picture image, are calculated in the overlap regions of the divided picture images, and the lines which do not include portions having large parallaxes caused by the depths of the objects in the two picture images, are used as joint lines by which even in the case of having the parallaxes caused by the depths of the objects and the case of including the image representing a moving body, an effect capable of forming a natural composite picture image having quality superior to that in the conventional technology and provided with small distortion, is achieved.

Namely, as described above, setting the joint lines makes it possible to hide the image of another object which is behind the object closest to the imaging means and becomes invisible from time to time in a vicinity of the periphery of the image of the object closest to the imaging means, by the image of the object closest to the imaging means, and accordingly the image quality of the composite picture image can be enhanced.

An eighth aspect of the invention provides a picture image forming apparatus, wherein the joint line setting means of the picture image forming apparatus sets joint lines on profiles most proximate to rims of the divided picture images among the profiles of the images of the objects in the respective overlap regions.

According to the eighth aspect of the invention, even in the case where the joint image formed by joint of the seventh aspect becomes unnatural, such as in the case where images of a plurality of objects having different depth dimensions exist in the overlap regions, by providing joint lines on the profiles of the image of the object close to the lines of the divided picture images, an effect capable of forming a natural composite picture image having good quality and inconsiderable distortion, is achieved.

A ninth aspect of the invention provides a picture image forming apparatus where the joint line setting means of the picture image forming apparatus calculates candidates of a plurality of joint lines by using respective different joint line determining methods and one of the candidates of joint lines is selected and determined to be the joint line.

According to the ninth aspect of the invention, the ninth aspect is performed in view of the case where depending on the positions of the objects in the overlap regions, the invention may not be performed adequately when the picture images as references are always fixed to either one of the pair of divided picture images according to the seventh and the eighth aspects of the invention. In that case, there are selected candidates of a plurality of joint lines which are calculated by using different joint line determining methods such as selection of picture images as references, a combination of the seventh and the eighth joint line setting methods or the like and an optimum joint line mostly minimizing differences in the images of the objects on the joint line is selected from the candidates by which an effect capable of forming a natural composite picture image having further stably improved quality and inconsiderable distortion is achieved.

A tenth aspect of the invention provides a picture image forming apparatus wherein the parallax sampling means corrects the parallaxes of the images of the respective objects such that a least parallax among the parallaxes sampled from the images of the respective objects is nullified.

According to the tenth aspect of the invention, the parallax sampling means corrects the sampled parallaxes as described above. An object of an image having the smallest parallax is an object farthest from the imaging means. A joint line is set on the profile of the image of the object having the largest parallax, namely an object proximate to the imaging means. In the image forming apparatus, the image of a far object on the joint line is less deviated by correcting the parallax of the image of the farthest object to zero. Further, since the joint line is set on the profile of the image of an near object, the image is hardly deviated. Namely in the invention the joint line is set on the profile of the image of an object close to the imaging means, so that in a composite picture image the image of another object which appears and disappears in the vicinity of the object close to the imaging means and is behind the object is hidden by the image of the object close to the imaging means, and additionally the deviation of the image of the object far from the imaging means becomes zero. Thereby unnatural shapes, positions etc. of the image of an object within the composite picture image can be eliminated, and a further natural composite picture image can be provided.

An eleventh aspect of the invention provides a storage medium capable of being read by a computer, storing a program for allowing the computer to execute the processings of:

inputting a pair of divided picture images having a parallax by imaging an object and a periphery of the object so as to include a same part of the object in predetermined imaging regions;

calculating overlap regions of the respective divided picture images including the images of the object;

sampling the parallax from the images of the object in the two overlap regions;

forming intermediate picture images to be provided by imaging the object from points between the observing points from which the respective divided picture images are imaged on the basis of the images of the object in the overlap regions of the pair of divided picture images and the sampled parallax; and providing a composite picture image by interpolating the parallax of the images of the object in the two overlap regions by the intermediate picture images and compositing the pair of divided picture images such that the overlap regions overlap.

According to the eleventh aspect of the invention, the program stored in the above-mentioned storage medium is read by the computer to be executed, whereby the above-mentioned processings can be sequentially executed. Thereby the computer calculates a parallax of an image of an object on the basis of an image of an object within an overlap region and forms intermediate picture images produce on the basis of the parallax to thereby combine a pair of picture images by interpolating the parallax of the image of the object. Accordingly, even when an image of an object in an input picture image has a parallax, it is possible to form a further natural composite picture image in comparison with the prior art.

A twelfth aspect of the invention provides a storage medium capable of being read by a computer, storing a program for allowing the computer to execute the processings of:

inputting a pair of divided picture images having parallaxes in images of objects by imaging the same objects respectively from two different observing points, calculating overlap regions including the images of the objects in the respective divided picture images, sampling the parallaxes from the images of the objects in the overlap regions, setting joint lines on a profile of the image of one of the objects most proximate to the observing points in the respective overlap regions based on the sampled parallaxes, and providing a composite picture image by compositing the pair of divided picture images such that the set joint lines overlap.

According to the twelfth aspect of the invention, the program stored in the above-mentioned storage medium is read by the computer, which executes sequentially the above-mentioned processings. Thereby the computer can set a joint line so that the joint line does not pass a position where an image of an object has a large parallax, to composite a pair of picture images. Accordingly, even when images of the pair of picture images may be deviated due to a parallax caused by a difference in depth or a motion of the object, a natural composite picture image of high quality which becomes less deformed can be formed.

BRIEF DESCRIPTION OF THE DRAWINGS

Other and further objects, features, and advantages of the invention will be more explicit from the following detailed description taken with reference to the drawings wherein:

FIGS. 8A through 8D are views showing a flow of processings in forming a panoramic picture image according to a panoramic picture image processing device in the first embodiment of the invention;

DETAILED DESCRIPTION OF THE PREFERRED EMBODIMENTS

Figure 1:
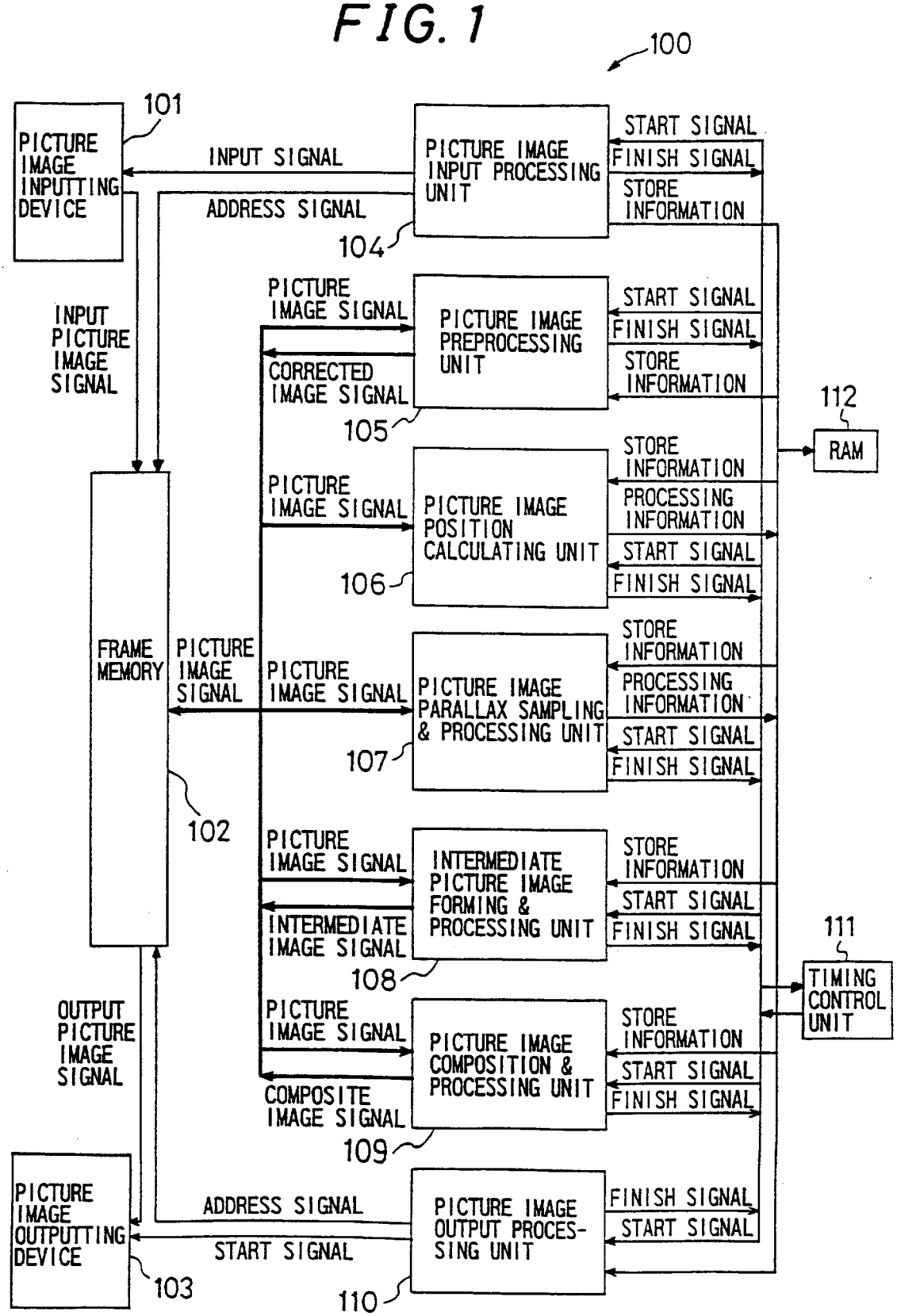
FIG. 1 is a block diagram showing the electric constitution of a panoramic picture image forming apparatus according to a first embodiment of the invention.

Now referring to the drawings, preferred embodiments of the invention are described below.

FIG. 1 is a block diagram showing the electric constitution of a panoramic picture image forming apparatus 100 according to a first embodiment of the invention. FIGS. 8A through 8D are views for explaining an outline of panoramic picture image forming processings in the panoramic picture image forming apparatus 100. An explanation will be given thereof in reference to both FIG. 1 and FIGS. 8A through 8D.

The panoramic picture image forming apparatus 100 includes a picture image inputting device 101, a frame memory 102, a picture image outputting device 103, a picture image input processing unit 104, a picture image preprocessing unit 105, a picture image position calculating unit 106, a picture image parallax sampling and processing unit 107, an intermediate picture image forming and processing unit 108, a picture image composition and processing unit 109, a picture image output processing unit 110, a timing control unit 111 and RAM 112.

The picture image inputting device 101 acquires a plurality of picture images constituting objects of compositing. Assume that the picture images constituting objects of composition are provided by, for example, pan-imaging as explained in the conventional technology. The plurality of picture images are respectively provided with regions having images of an object that is the same as an object in other picture images, which are referred to as overlap regions. The images of the object include deviation by parallax and distortion. Although according to the panoramic picture image forming apparatus 100, a picture image is dealt with in a mode of a picture image signal for representing the picture image, the picture image signal may be referred to as "picture image" in the specification.

Figure 5:
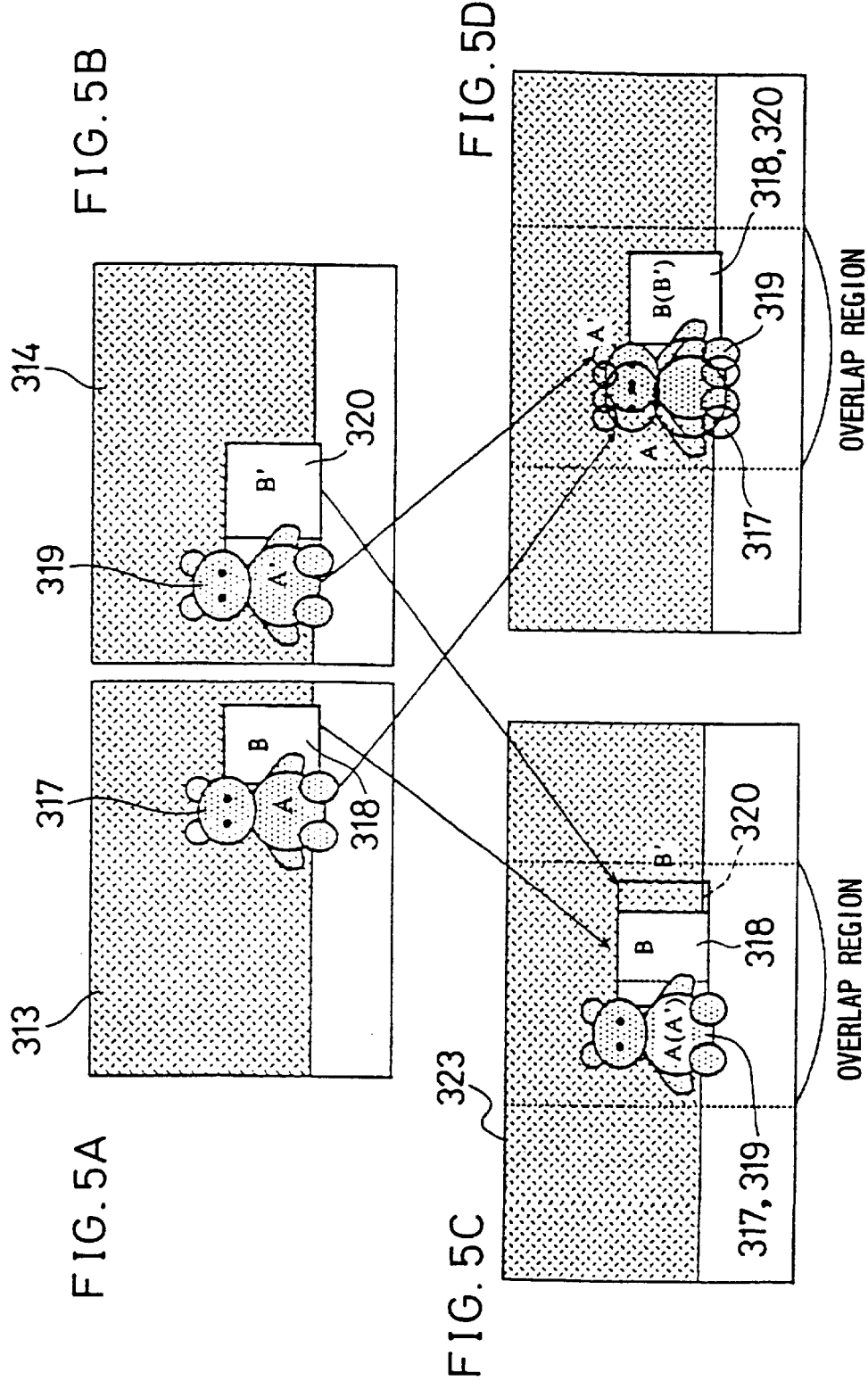
FIGS. 5A and 5B are views showing picture images 313 and 314 imaged in the constitution of FIG. 4, FIGS. 5C and 5D are views showing that in forming a panoramic view by a conventional technology, images 317, 319; 318, 320 are objects in overlap regions of the picture images 313 and 314 which do not coincide with each other by a difference in depths of the objects.

In the following explanation, it is assumed that a plurality of picture images constituting objects of composition are picture images $I(k)$ and $I(k+1)$ shown by FIG. 8A. The picture images I(k) and I(k+1) are the same as the picture images 313 and 314 in FIGS. 5A and 5B and an explanation of the notations will be omitted. A portion of the picture image I(k) right from the central portion and a portion of the picture image I(k+1) left from the central portion constitute overlap regions W1 and W2. A number of the plurality of picture images constituting objects of composition may naturally be 3 or more.

The picture image input processing unit 104 provides and stores the plurality of picture images constituting objects of composition from the picture image inputting device 101 to the frame memory 102. The picture image preprocessing unit 105 performs preprocessing individually with respect to the respective picture images stored to the frame memory 102. The picture image position calculating unit 106 calculates parallely moved amounts of the pair of picture images I(k) and I(k+1) stored to the frame memory 102.

The picture image parallax sampling and processing unit 107 calculates deviations of positions in the picture images I(k) and I(k+1) with respect to images of the same object in the respectives of the pair of picture images I(k) and I(k+1) and forms parallax picture images representing the magnitude of the deviation by the unit of pixel for each of the picture images I(k) and I(k+1). Hereinafter, the deviation is referred to as "deviation between images of object". A parallax picture image 701 of the picture image I(k) with a reference of the picture image I(k+1) and a parallax picture image 702 of the picture image I(k+1) with a reference of the picture image I(k) are shown in FIG. 8B.

The intermediate picture image forming and processing unit 108 divides the overlap regions W1 and W2 respectively into n of a plurality of small regions in the horizontal direction, combines the small regions of the overlap region W1 with the small regions of the overlap region W2 and forms the intermediate picture images IIk(l) through IIk(n) as shown by FIG. 8C with the deviations of the images of the object as parameters. The intermediate picture image is equal to an image to be obtained by installing the camera at one of points provided by internally dividing an interval between positions of the camera in respectively imaging the pair of picture images I(k) and I(k+1) by a ratio of p:n–p (p=1~n–1) and imaging the object constituting the object of imaging in each of the imaging operations, and is obtained by calculation.

The picture image compositing and processing unit 109 successively composites the plurality of picture images stored to the frame memory 102 by using the parallely moved amounts of the pairs of picture images and the intermediate picture images by which one sheet of a panoramic picture image is obtained. As shown by FIG. 8D, the panoramic picture image is a picture image where a portion 706 of the picture image I(k) except the overlap region W1, the intermediate picture images IIk(1) through IIk(n) and a portion 707 of the picture image I(k+1) except the overlap region W2 are arranged from the left side in this order. The picture image output processing unit 110 provides and displays the panoramic picture image formed by the picture image compositing and processing unit 109 to the picture image outputting device 103. The timing control unit 111 controls timings of operation at the respective units 104 through 110.

Figure 3:
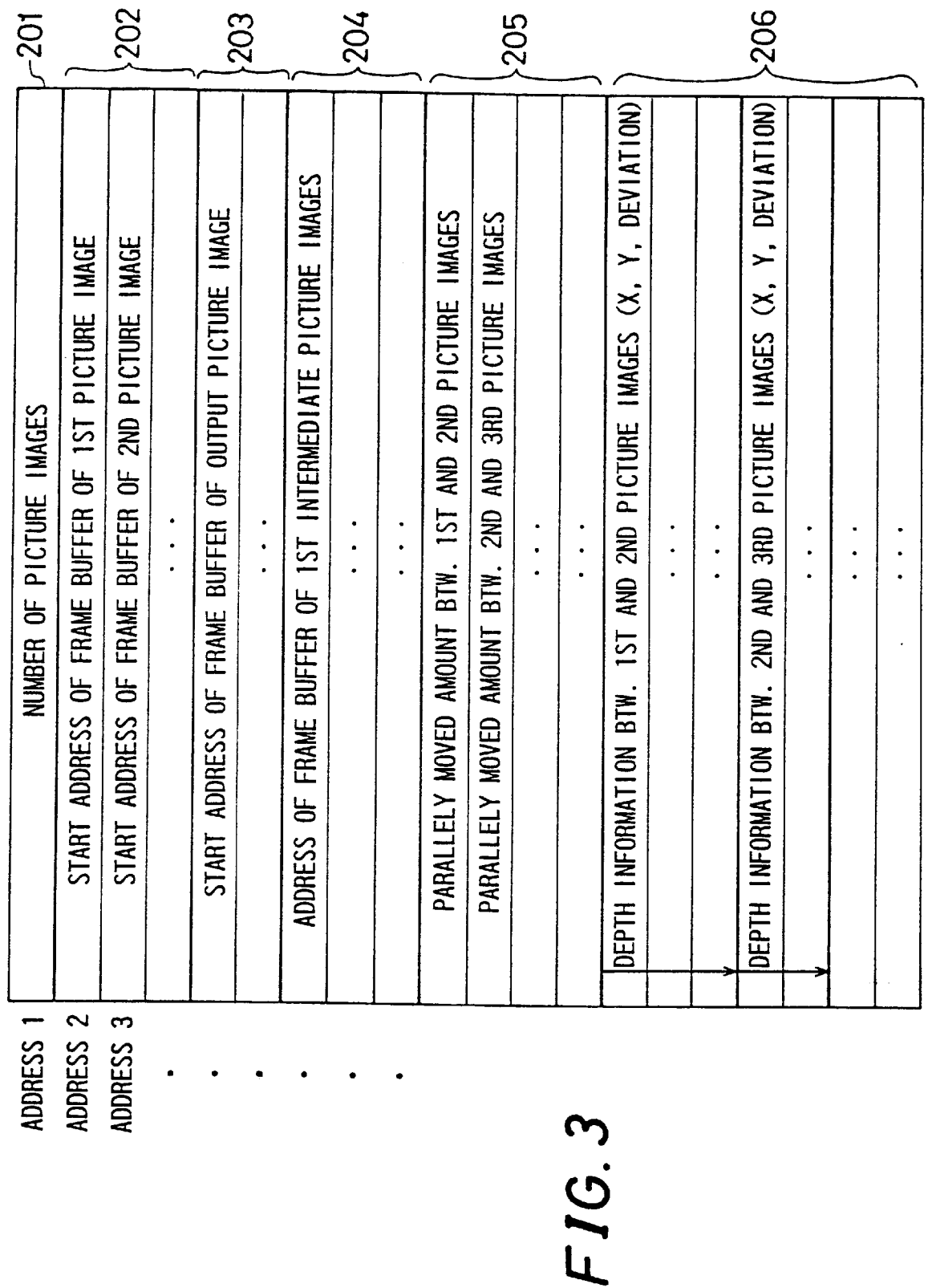
FIG. 3 is a view showing an embodiment of RAM 112 in FIG. 1.
Figure 4:
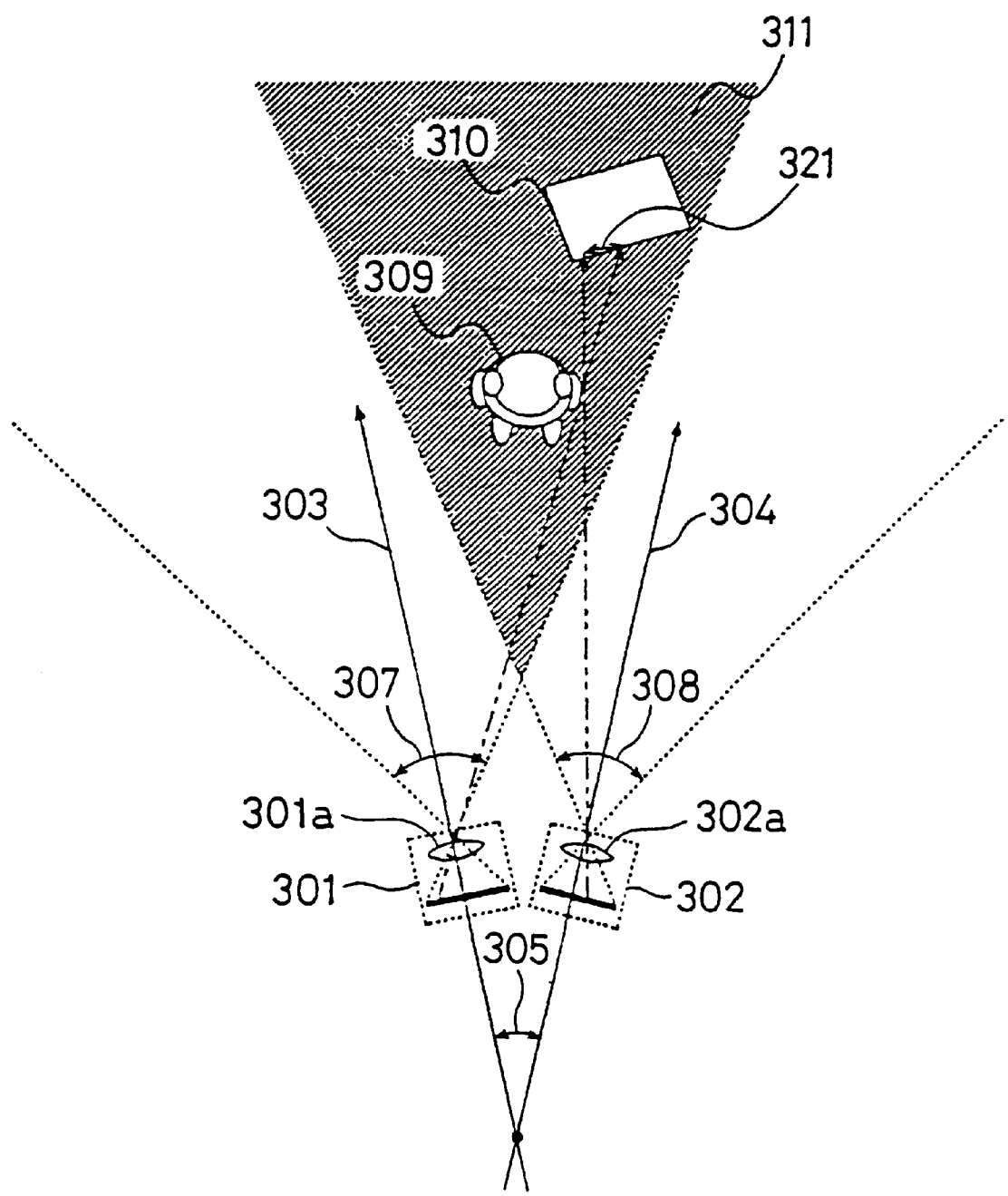
FIG. 4 is a view showing behavior of imaging picture images having overlap regions by moving a camera or in a plurality of cameras.

FIG. 3 is a view showing an example of the memory structure of RAM 112 and RAM 112 is used for obtaining information stored in regions designated by predetermined addresses or storing information produced by respective processings in accordance with some processings, explained below.

For that purpose, the memory space of RAM 112 is divided into a plurality of regions at equal intervals and an address representing a position of the front of the region in the memory space is added to each region. In FIG. 3, Address 1, Address 2, Address 3 . . . are added to the respective regions arranged from the upper most region toward the downward direction. In the following explanation, write, read and store information to a single or a plurality of regions of RAM 112 are referred to as "write, read and store to address".

For example, a number of frames of picture images stored to the frame memory 102 is stored to a front region 201. Addresses of front regions among a single or a plurality of regions storing 1-th through n-th picture images in the frame memory 102 are stored to respective regions of a group of first regions 202 that are constituted by a plurality of regions from the second region to a region at a predetermined ordinal number. The addresses of front regions among a single or a plurality of regions storing a panoramic picture image in the frame memory 102 are stored to respective regions of a second group of regions 203 that are constituted by a plurality of regions from a region next to the first group of regions 202 to a region at a predetermined ordinal number. Addresses of front regions among a single or a plurality of regions storing an intermediate picture image ga in the frame memory 102 are stored to the respective regions of a third group of regions 204 that are constituted by a plurality of regions from a region next to the second group of regions 203 to a region at a predetermined ordinal number. Parallely moved amounts among respective picture images are stored to respective regions of a fourth group of regions 205 that are constituted by a region next to the third group of regions 204 to a region at a predetermined ordinal number. Deviations of images of objects among respective picture images are stored respectively over a plurality of regions to a fifth group of regions 206 that are constituted by a plurality of regions from a region next to the fourth group of regions 205 to a region at a predetermined ordinal number.

A detailed explanation will be given of processings of forming a panoramic picture image by using the panoramic picture image forming apparatus 100 in reference to FIG. 1 as follows.

When a total of the system is started, the timing control unit 111 transmits reset signals to the picture image input processing unit 104, the picture image preprocessing unit 105, the picture image position calculating unit 106, the picture image parallax sampling and processing unit 107, the intermediate picture image forming and processing unit 108, the picture image compositing and processing unit 109 and the picture image output processing unit 110. The processings at the respective units 104 through 110 enter an awaiting state in response to the reset signals until they receive start signals from the timing control unit 111.

First, the timing control unit 111 outputs the start signal to the picture image input processing unit 104 for storing picture image to the frame memory 102 and enters an awaiting state until the timing control unit 111 receives a finish signal from the picture image input processing unit 104.

Upon receiving the start signal from the timing control unit 111, the picture image input processing unit 104 performs a processing for storing a plurality of picture images to the frame memory 102 in respect of the picture image inputting device 101.

When picture images are composited on-line, that is, when imaging of an object and composition of picture images are continuously performed, the picture image inputting device 101 comprises picture image inputting means, for example, a camera and an A/D converting means for converting analogue picture image signals obtained from the picture image inputting means into digital picture image signals and the processing is a processing where the picture image inputting means carries out imaging of picture image by the signal from the picture image input processing means 104, converts the analogue picture image signals obtained thereby into the digital image signals by the A/D converting means and transmits the digital picture image signals to predetermined addresses of the frame memory 102.

When picture images are composited off-line, that is, when imaging of an object and composition of picture images are separately carried out, the picture image inputting device 101 is a device for storing picture images and the processing is a processing where the picture image input processing unit 104 transmits the picture image signals stored to the picture image inputting device 101 to predetermined addresses of the frame memory 102.

Upon finishing the transmission of all the picture images to the frame memory 102, the picture image input processing unit 104 writes a number of frames of picture images transmitted to the frame memory 102 and addresses to which the picture images are stored in the frame memory 102, successively to predetermined addresses of RAM 112 and thereafter, transmits a picture image input finishing signal to the timing control unit 111 whereby the processing is finished.

In the following explanation, assume that two frames of picture images I(k) and I(k+1)(k=1,2, . . . n) having continuous regions stored to the frame memory 102, are a pair of picture images including an image of the same object. The number of frames of picture images stored to the frame memory 102 is read as a number of frames of picture images to be processed in the following processings.

Upon receiving a finish signal of transmission of the inputted picture images to the frame memory, the timing control unit 111 transmits the start signal to the picture image preprocessing unit 105 and enters an awaiting state until the picture image preprocessing unit 105 receives a finish signal from the picture image preprocessing unit 106.

Upon receiving the start signal from the timing control unit 111, the picture image preprocessing unit 105 reads a number of frames of picture images to be processed from RAM 112 and stores the number of frames. Further, the picture image preprocessing unit 105 sets a counter k to 1. The picture image preprocessing unit 105 reads an address in the frame memory 102 of the picture image I(k) corresponding to the counter k from RAM 112. The picture image preprocessing unit 105 carries out a known processing of removing distortion in respect of the read picture image I(k). The processing includes, for example, correction of aberration of lens of imaging means or the like. The picture images removed of the distortion are again written to the same address of the frame memory 102. The preprocessing in respect of the picture image I(k) comprises processings of from reading the address of the picture image I(k) to rewriting the picture image. The counter k is incremented by 1 and is compared with the number of frames of picture images and when the counter is equal to or less than the number of frames of picture images, the preprocessing is carried out with respects to a next picture image. When the counter k becomes larger than the number of frames of picture images, the picture image preprocessing unit 105 transmits a picture image preprocessing finish signal to the timing control unit 111 whereby the processing is finished.

Upon receiving the finish signal from the picture image preprocessing unit 105, the timing control unit 111 transmits the start signal to the picture image position calculating unit 106 and enters an awaiting state until the timing control unit 111 receives a finish signal from the picture image position calculating unit 106.

Figure 9A:
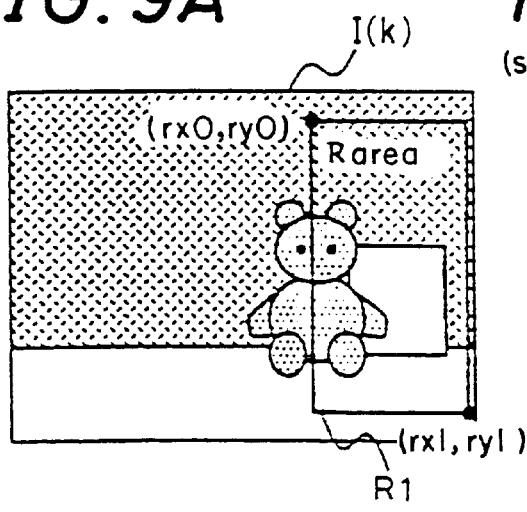
FIGS. 9A through 9E are views showing behavior of calculating a parallely moving amounts of picture images $I(k)$ and $I(k+1)$.

Upon receiving the start signal from the timing control unit 111, the picture image position calculating unit 106 reads and stores the number of frames of picture images to be processed from RAM 112 and sets the counter k to 1. Next, the picture image position calculating unit 106 reads from RAM 112 the address in the frame memory 102 of the reads picture image I(k) in correspondence with the counter k and a portion (Rx0, Ry0)–(Rx1, Ry1) constituting a reference region R1 of pattern matching as shown by FIG. 9A included in the predetermined picture image I(k) within the frame memory 102 in accordance with the address. The reference region R1 is set to, for example, a predetermined position included in the overlap region of the picture image I(k).

Further, the picture image position calculating unit 106 similarly reads a search region BL; (Sx0, Sy0)–(Sx1, Sy1) of the picture image I(k+1) next to the picture image. In respect of the search region BL, when a positional relationship between the picture images I(k) and I(k+1) is known to some degree, that is, when the imaging is carried out under a constant positional relationship or when an outline positional relationship is given from outside after the imaging operation, the search region is restrictively set in accordance with the information such that the search region is smaller than the total region of the picture image I(k+1), or when the positional relationship is not determined yet, the total region of the picture image is read as the search region.

Figure 9B:
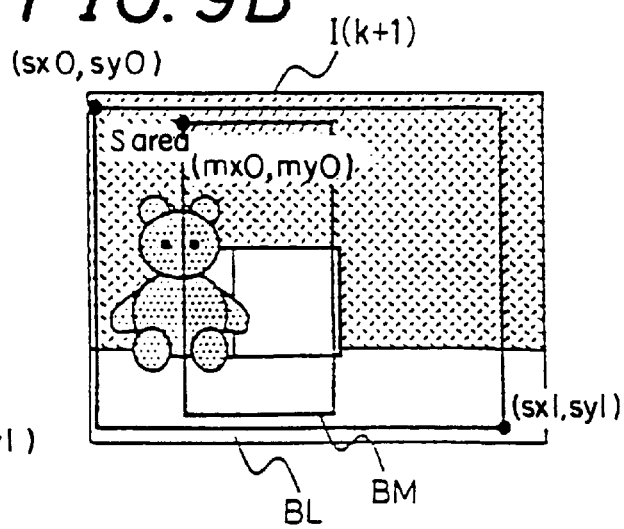
Figure 9C:
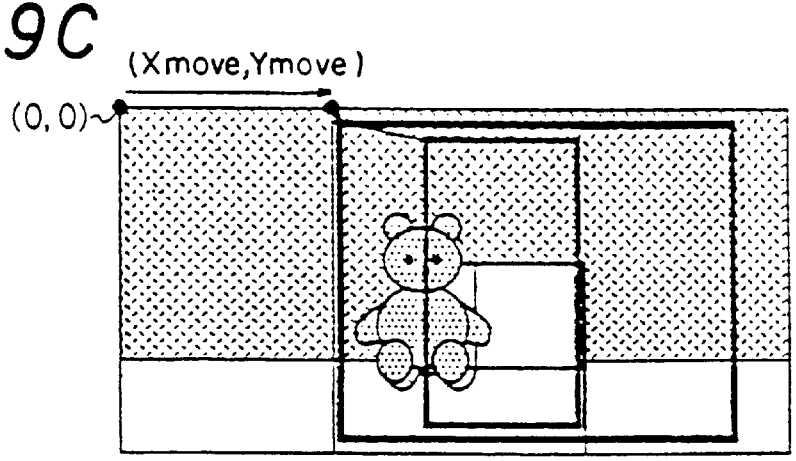

The pattern matching is carried out based on the reference regions and the search regions of the respective read picture images whereby reference positions of regions where the reference regions match in the search regions, that is, reference positions of regions (mx0, my0) having the highest correlation values in respect of the reference regions in the search regions, are calculated. The correlation value is calculated by, for example, calculating in accordance with the following equation. In FIG. 9B, the region is referred to as a matching region BM as a region matching the reference region with the position (mx0, my0) as one of apexes. Correlation value=

$$1.0/\Sigma_{(x,y)\in Rarea}\frac{1}{2}R(x,y)-S(x+\text{offset}_x, y+\text{offset}_y) \quad (1)$$

Here, notation $R_{area}$ designates the reference region, R(x, y) designates a brightness value at coordinates (x, y) of the reference region, S(x, y) designates a brightness value at coordinates (x, y) in the search region and ($\text{offset}_x$, $\text{offset}_y$) designates the offset of the searched picture image from the original point (0, 0).

Here, as shown by FIG. 9B, the calculated position (mx0, my0) designates a position at respective picture images of the reference region and the search region cut out from the original picture images and accordingly, correction is performed by the following Equations (2) and (3) whereby the parallely moved amounts of the picture images I(k) and I(k+1) ($X_{move}$, $Y_{move}$) are calculated. The parallely moved amounts are written to predetermined addresses of RAM 111. A position shifted from the original point (0, 0) of the picture image I(k) by the parallely moving amounts ($x_{move}$, $y_{move}$), is a position to be overlapped with the original point of the picture image I(k+1) when the picture image I(k)

overlaps the picture image I(k+1) by overlapping the images of the same object.

$$x_{move} = Rx0 - (mx0 + Sx0) \quad (2)$$

$$y_{move} = Ry0 - (my0 + Sy0) \quad (3)$$

where Rx0 and Ry0 are x- and y-coordinates of a reference point of the reference region R, respectively, and Sx0 and Sy0 are x- and y-coordinates of a reference point of the search region S, respectively. In the embodiment, upper left vertexes of the regions R and S are considered as the reference points.

By the above operation, the parallely moved amounts can be calculated. The processing of calculating the position of the picture image includes from reading the address of the picture image I(k) to writing the parallely moved amount.

Figure 2:
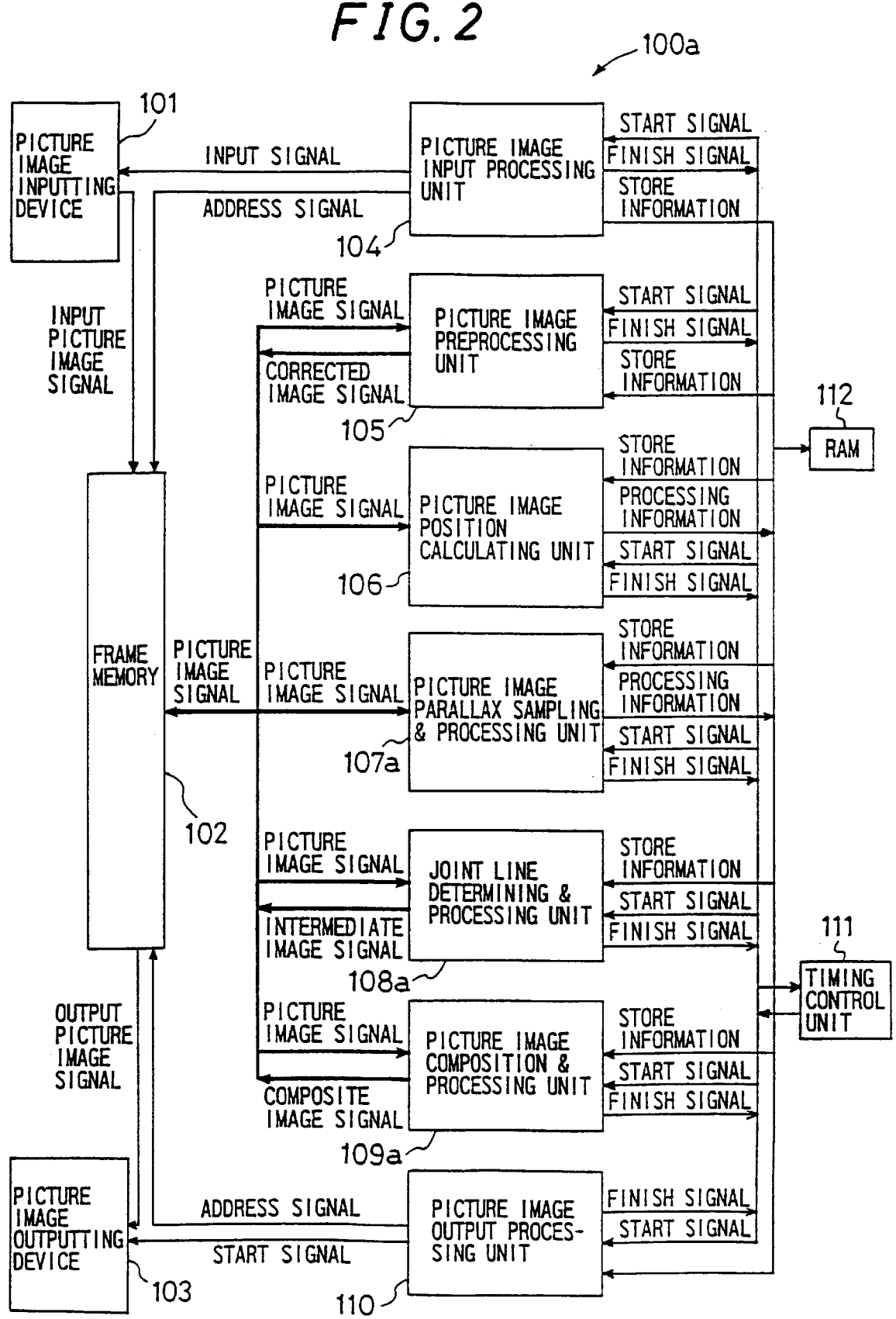
FIG. 2 is a block diagram showing the electric constitution of a panoramic picture image forming apparatus according to a second embodiment of the invention.
Figure 9D:
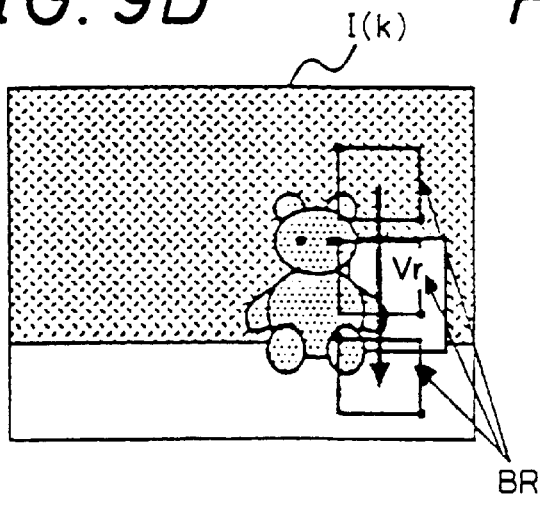
Figure 9E:
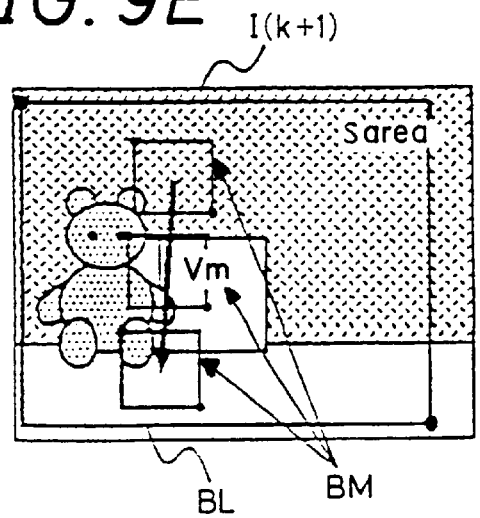

Further, if necessary, as shown by FIGS. 9D and 9E, 2 or more of reference regions are provided, the pattern matching is carried out for the respective reference regions and by using the result, a change in the scale of the image of the object can be calculated from changes in distances among the reference regions and distances among the matching regions and a relative rotational angle of image or the like can be calculated by a difference in directions made by the arrangement of the reference regions and the arrangement of the matching regions. For example, when notation Vr designates a vector having both ends which are centers of two reference regions and notation Vm designates a vector having both ends which are centers of two matching regions, the scale S(k) is calculated by Equation (4) and the rotational angle q(k) is calculated by Equation (5). |Vr| designates the size of the vector Vr and |Vm| designates the size of the vector Vm.

$$S(k) = |Vm|/|Vr| \quad (4)$$

$$q(k) = \cos^{-1} |Vm||Vr|/(|Vm| + |Vr|) \quad (5)$$

The processing is carried out before and after the processing of calculating the position of the picture image and from the scale S(k) and the rotational angle q(k) of the picture image I(k+1) in respect of the picture image I(k), the picture image I(k+1) is multiplied by 1/Sk and the picture image I(k+1) is rotated by -q(k) and also multiplied and rotated picture image I(k+1) may be written to the address of the original picture image I(k+1) at the frame buffer.

After performing the above-described processing, the counter k is incremented by 1, compared with a number of frames of picture images and when the counter k is smaller than the number of frames of picture images, a processing of calculating a next picture image position is carried out. When the counter k is equal to or larger than the number of frames of picture images, the picture image position calculating unit 106 transmits a picture image position calculation finish signal to the timing control unit 111 by which the processing is finished.

Upon receiving the finish signal from the picture image position calculating unit 106, the timing control unit 111 transmits the start signal to the picture image parallax sampling and processing unit 107 and enters an awaiting state until the timing control unit 111 receives a finish signal from the picture image parallax sampling and processing unit 107.

Upon receiving the start signal from the timing control unit 111, the picture image parallax sampling and processing unit 107 reads and stores the number of frames of picture images to be process from RAM 112 and sets the counter k to 1. Next, the picture image parallax sampling and processing unit 107 reads from RAM 112 the address in the frame memory 102 of the picture image I(k) in correspondence with the counter k and reads the picture image in the frame memory 102 by the address. Further, the picture image parallax sampling and processing unit 107 reads a next picture image (in correspondence with the counter k+1) next to the picture image.

Thereafter, the picture image parallax sampling and processing unit 107 reads from RAM 112 the parallely moved amounts calculated from the picture image position calculating unit 106 and respectively calculates regions W1 and W2 where the picture image I(k) and the picture image I(k+1) overlap with respects to the picture image I(k) and the picture image I(k+1).

Further, the picture image parallax sampling and processing unit 107 divides the overlap region W1 of the picture image I(k), determines the respectives as reference regions and searches matching regions in correspondence with the respective reference regions from the picture image I(k+1) by using the method of pattern matching. At this occasion, the search is carried out in order to calculate a deviation between the images of the object caused by parallax and therefore, the region for calculating the search correlation value may be moved only in the horizontal direction. The deviation amount is an amount of apparently moving a body due to the parallax and the amount is caused by the depth and accordingly, the depth of the body represented by the images of the object in the reference regions can be estimated from the direction of deviation and the amount of deviation.

Assume that when the picture image I(k) and I(k+1) are made to overlap by coinciding certain points of the depth, the deviation of the images of the same object is calculated in the overlap region of the picture images I(k) and I(k+1). In this case, when a body more proximate to a camera than the points is the object, the image of the object of the picture image I(k+1) is further deviated to the left than the image of the object of the picture image I(k). Further, when a body further remote from the camera than the points is the object, the image of the object of the picture image I(k+1) is further deviated to the right than the image of the object of the picture image I(k).

Figure 10:
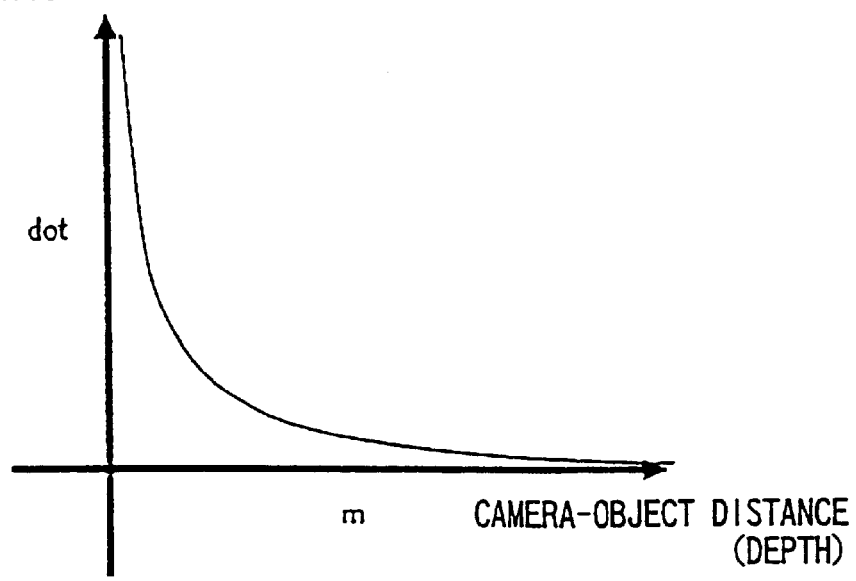
FIG. 10 is a graph showing a relationship between a deviation amount of matching between picture images and a depth from a camera.

FIG. 10 is a graph showing a relationship between a deviation amount between images of an object and an actual depth of the object when an amount of apparent movement of a body at an infinitely remote point is 0. The ordinate is the amount of deviation between the images of the object (unit; dot) and the abscissa is the depth (unit; m). The amount of deviation between the images of the object is reduced in inverse proportion to the depth.

That is, when the picture images I(k) and I(k+1) are made to overlap by coinciding certain points of depths thereof, even with the overlap region having the same width, owing to the parallaxes, the more proximate to a camera a body is disposed compared with the points, the larger the deviation amount to the left and the more remote from the camera the body is disposed compared with the points, the larger the deviation amount to the right. Here, although according to the present application, the depth is a distance in correspondence with the parallely moved amount calculated at the picture image position calculating unit 106, in this case, the distance may be corrected based on the calculated deviation amount in the overlap region. For example, Assuming that a left side deviation is positive and a right side deviation is negative, when the distance is matched to a location of the image of the object having the deepest depth in the picture image, the reference value is determined as a minimum value of the deviation amount and when the distance is matched to a location of the image of the object having the shallowest depth in the picture image, the reference value is determined as a maximum value of the deviation amount, or the reference value may be determined as an average of the deviation amounts. The deviation amount is corrected by adding the calculated reference value to the parallely moved amount in RAM 112 and calculating differences between the respective deviation amounts and the reference value in the overlap region that are calculated currently and writing the differences to RAM 112 as deviation amounts. Thereby, the deviation amount as a reference value can be corrected to 0.

According to the processing, the accurate depth is not calculated, but the parallax accompanied by the difference in the depth, that is, the deviation amount per se between the images of the object is stored to RAM 112 for the respective reference regions and the respective matching regions or the respective pixels.

Figure 6A:
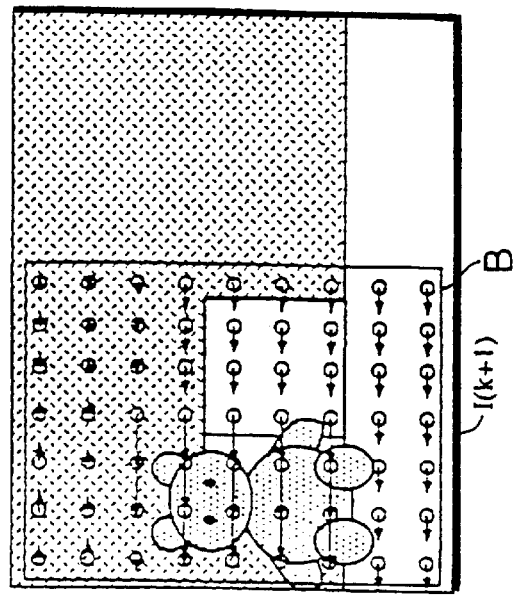
FIGS. 6A through 6C are views showing behavior of matching for detecting deviations in images of objects caused by their depths.
Figure 6B:
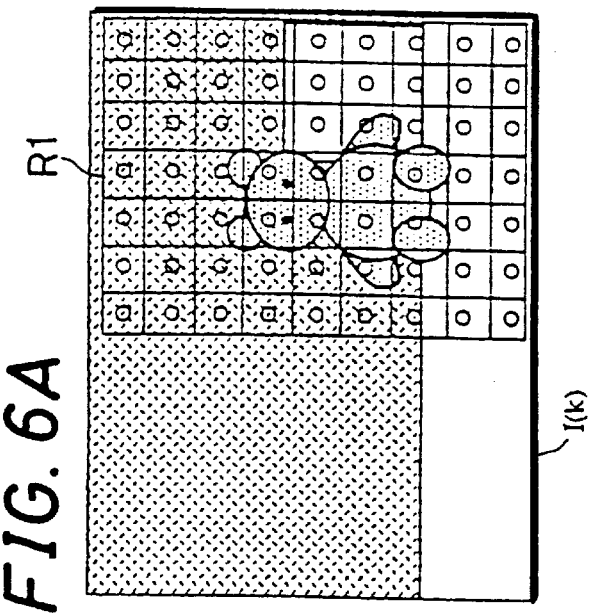
Figure 6C:
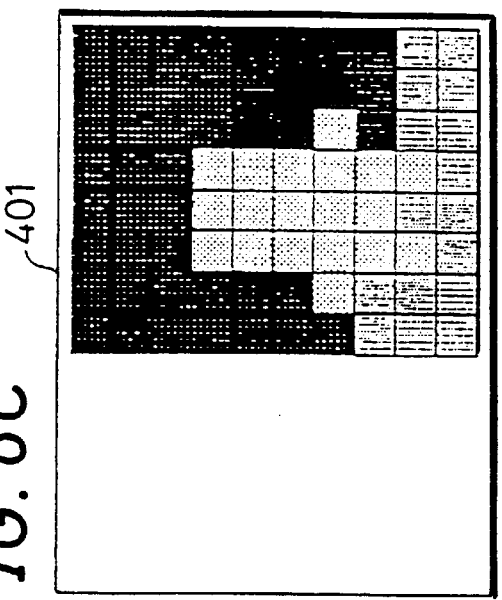

FIGS. 6A, 6B and 6C are views showing a flow of specific processings for carrying out the parallax sampling. Each square of cross rule of the picture image I(k) shown by FIG. 6A corresponds to a reference region and a circle in the region designates the center of region. A frame in the picture image I(k+1) designates an overlap region and a circle corresponds to the circle showing the center of the region of the picture image I(k) and an arrow mark extending therefrom designates the direction of deviation and the amount of deviation between the images of the object in each reference region calculated by the matching operation. Here, when the right side picture image I(k+1) is imaged by a camera at a position on the right side of a position of imaging the picture image I(k) on the left as shown by FIG. 6A and FIG. 6B, in respect of the deviation in the right direction, the larger the deviation amount, the deeper the depth and in respect of the deviation in the left direction, the larger the deviation amount, the shallower the depth. FIG. 6C shows a parallax picture image 401 that is shown by brightness values of pixels with a positive direction of the deviation amount in the left direction. The darker the brightness of the pixel, the smaller the parallax, that is, the deeper the depth and the brighter a portion, the larger the parallax, that is, the shallower the depth. By further dividing the reference regions, the finer parallax sampling can be carried out.

In a similar way, the depth sampling is carried out with the picture image I(k+1) as the reference side and the picture image I(k) as the search side. The result of sampling the parallax of the picture image I(k+1) is similarly stored to RAM 112. The parallax sampling processing includes processings of from reading the address of the picture image I(k) to storing the result of the parallax sampling.

When the parallax sampling processing of the picture image I(k) and the picture image I(k+1) has been finished, the counter k is added with 1. When the counter k is smaller than the number of frames of picture images, the parallax sampling processing is carried out in respect of the picture image I(k) and the picture image I(k+1). When the counter k is equal to or more than the number of frames of picture images, the picture image parallax sampling and processing unit 107 transmits a finish signal to the timing control unit 111 by which the processing is finished.

Upon receiving the finish signal from the picture image parallax sampling and processing unit 107, the timing control unit 111 transmits the start signal to the intermediate picture image forming unit 108 and enters an awaiting state until the timing control unit 111 receives a finish signal from the intermediate picture image forming unit 108.

Upon receiving the start signal from the timing control unit 111, the intermediate picture image forming and processing unit 108 reads and stores the number of frames of picture images to be processed from RAM 112 and sets the counter k to 1. Next, the intermediate picture image forming and processing unit 108 reads from RAM 112 an address in the frame memory 102 of a picture image in correspondence with the counter k and reads the picture image I(k) in the frame memory 102 from the address. Further, the intermediate image forming and processing unit 108 reads the picture image I(k+1) (in correspondence with counter k+1) next to the picture image.

Thereafter, the intermediate picture image forming and processing unit 108 reads from RAM 112 the parallely moved amount calculated at the picture image position calculating unit 106 and respectively calculates the overlap region of the picture image I(k) and the overlap region of the picture image I(k+1).

An intermediate picture image is a picture image formed from 2 frames of picture images imaged at positions having different observing points by calculating a picture image to be imaged at a position at a middle point of the two observing points.

Positions of a camera when the picture images I(k) and I(k+1) are imaged, are designated as imaging positions Tk and Tk+1. In this case, the overlap regions W1 and W2 of the picture images I(k) and I(k+1) are respectively divided into n−1 of small regions in the horizontal direction. By using the respective small regions, intermediate picture images IIk(l) (l=1, 2, 3, ... N−1) are formed. For example, an intermediate picture image IIk(l) formed by using a small region at the left end is the same as a picture image to be provided by the camera installed at a position internally dividing an interval between the imaging positions Tk and Tk+1 by a ratio of 1 to n−1. Similarly, intermediate images IIk(l) formed by using 2-th from left through (n−1)-th small regions, are the same as picture images to be provided by the camera installed at the positions internally dividing the interval between the imaging positions Tk and Tk+1 by ratios of 2 to n−2 through n−1 to 1. For each of the pair of picture images I(k) and I(k+1), n−1 of the intermediate picture images IIk(l) are provided.

A method of forming an intermediate picture image in forming the intermediate picture image at a position internally dividing the interval between the imaging position $T_k$ and the imaging position $T_{k+1}$ by a ratio of 1 to (n−1), is shown below. The deviation between the images of the object in respect of the picture image I(k) and the picture image I(k+1) calculated at the parallax sampling and processing unit 107, are read from RAM 112 for each pixel or for each region.

Figure 7A:
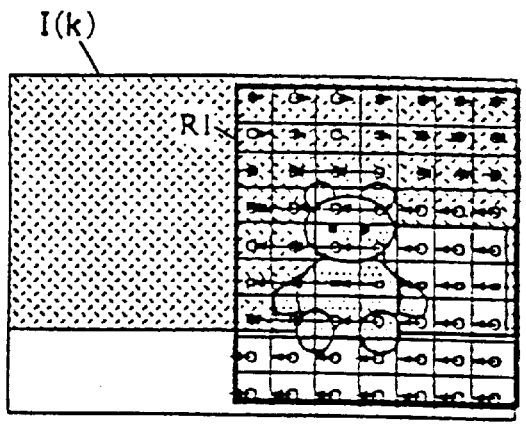
FIGS. 7A through 7E are views showing behavior of forming an intermediate picture image $II_k(l)$.
Figure 7B:
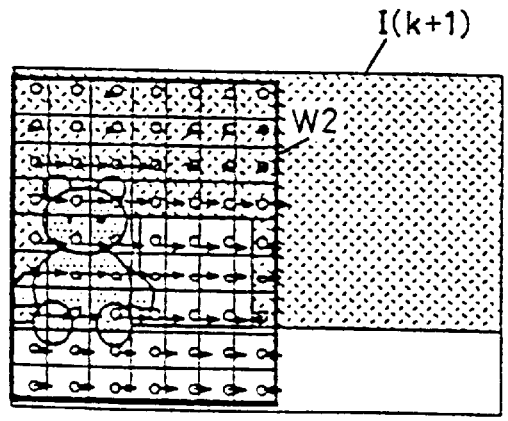

As shown by FIG. 7A and FIG. 7B, the coordinates of a point P1 in the overlap region R1 (rx0, ry0)–(rx1, ry0) of the picture image I(k) in respect of the picture image I(k+1), are defined as (x1, y1), the brightness value at the coordinate of the point P1 is defined as D(P1), the deviation amount between the images of the object at the coordinates of the point P1 is defined as M(P1) (arrow mark of FIG. 7A) and the coordinates of a point P2 in the overlap region R2 (rx2, ry2)–(rx3, ry3) of the picture image I(k+1) in respect of the picture image I(k) are defined as (x2, y2) and the brightness value at the coordinates of the point P2 is defined as D (P2) and the deviation amount between the images of the object as the point P2 is defined as M(P2) (arrow mark of FIG. 7B).

First, the intermediate picture image $II_k(l)$ (FIG. 7C) with a reference of the picture image I(k) is formed. Assume that the brightness value D(P1) of the respective point P1 (x, y), ($rx0 \leq x \leq rx1$, $ry0 \leq y \leq ry1$) in the overlap region R1 is equal to the brightness of ($x+M(P1)/n-rx0$, $y-ry0$) on the intermediate picture image $II_k(l)$. The brightness value D(P1) is written to RAM 112 as the brightness value of the above-described point of the intermediate picture image $II_k(l)$. This processing is carried out with respect to all the points in overlap region R1.

Figure 7C:
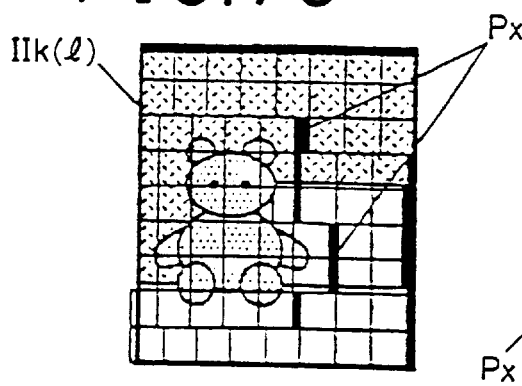

When the intermediate picture image $II_k(l)$ is formed only by the picture image I(k), owing to the difference in the deviation amounts caused by a difference in the parallaxes for each pixel, at a portion of the intermediate picture image, a plurality of brightness values of pixel may be written or undefined pixel where the brightness value cannot be determined may be produced as shown by a blacks pixel portion Px in FIG. 7C.

In forming the intermediate picture image, when the brightness value has already been written, the brightness value of a pixel having a large deviation amount M(P1) is written with priority. The reason is that the larger the deviation amount M(P1), the more proximate to the camera a body is disposed and writing of a brightness value of a body that is disposed deeper than that or background is unnatural. Further, with respect to the undefined pixel, as mentioned later, the undefined pixel is interpolated by the intermediate picture image $II_{k+1}(l)$ formed from the picture image I(k+1).

Figure 7D:
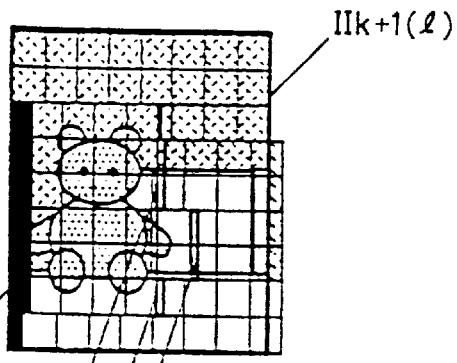

Similar to the formation of the intermediate picture image $II_k()$, the intermediate picture image $II_{k+1}(l)$ with a reference of the picture image I(k+1) is formed (FIG. 7D). Specifically, the respective points P2 (x, y) ($rx2 \leq x \leq rx3$, $ry2 \leq y \leq ry3$) in the overlap region W2 are written to RAM 112 as the brightness value D(P2) of points ($x+M(P2)(n-1)/n-rx0$, $y-ry0$) on the intermediate picture image $II'_{k+1}(l)$. However, as mentioned above, when the brightness value has already been written, priority is given to the brightness value of the pixel having a larger deviation amount M(P1).

Thereafter, by using the intermediate picture image $II'_{k+1}(l)$ formed by the picture image I(k+1) and the deviation amount for each pixel, the undefined pixel in the intermediate picture image $II_k(l)$ formed by the picture image I(K) and the deviation amount for each pixel, is interpolated by the pixel of the corresponding intermediate picture image $II'_{k+1}(l)$.

Specifically, with respect to the interpolation, firstly assume a state where the intermediate picture images $II_k(l)$ and $II_k(l+1)$ overlap such that the images of the same object overlap. Under this state, the brightness value of the pixel of the intermediate picture image $II_k(l+1)$ overlapping the undefined pixel Px of the intermediate picture image $II_k(l)$ is written to a predetermined address of RAM 112 as the brightness value of the undefined pixel.

Figure 14:
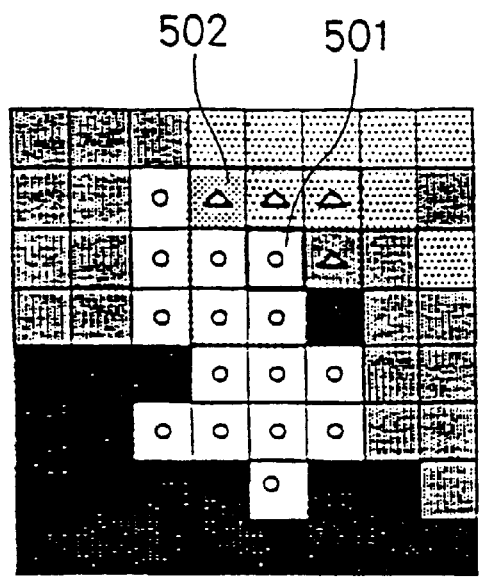
FIG. 14 is a view showing an interpolating method from surroundings of undefined pixels in forming the intermediate pixel $II_k(l)$.

Finally, when there is a portion where the brightness value is not written to the intermediate picture image, interpolation is carried out by the brightness value written to the surrounding. FIG. 14 is a view showing behavior of interpolation. Each square correspond to one pixel and a pixel having a circle at the center is an undefined pixel. Now, the brightness value of an undefined pixel 501 surrounded by bold lines, is assumed to be an average of brightness values of already defined pixels, or according to FIG. 14, pixels having triangular marks at their centers in the vicinity 8 surrounded by bold broken lines 502. The above-described operation is repeated with respect to all the undefined pixels. When all the pixels with the vicinity 8 are undefined, the interpolating operation is carried out again after finishing interpolation of other undefined pixels and repeated until the undefined pixels are not present.

An interpolated picture image having a better quality can be provided by carrying out the interpolating operation from undefined pixels having a large number of pixels in already defined pixels the vicinity 8.

Figure 7E:
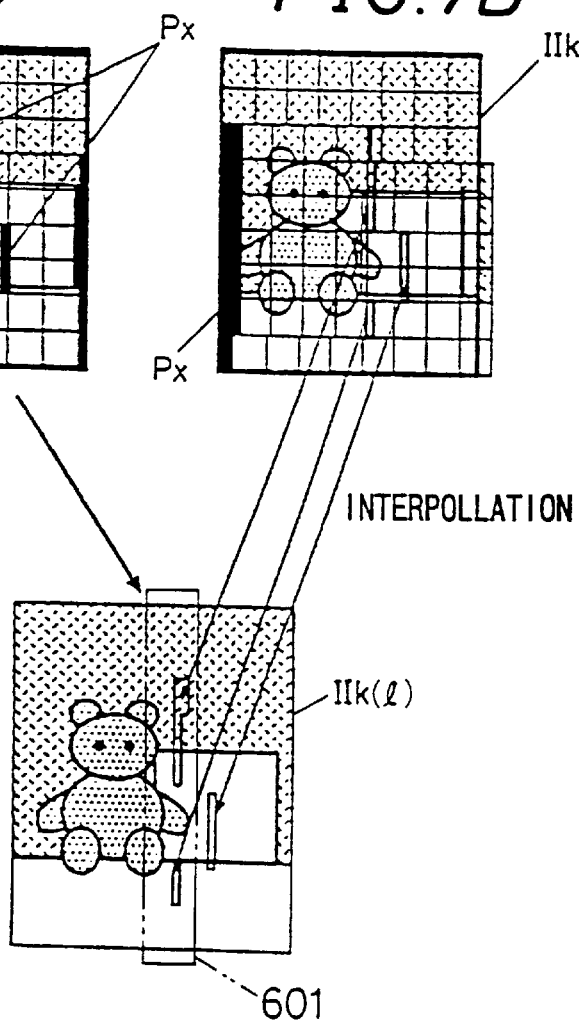

In this way, the intermediate picture images $II_k(l)$ are formed and among them, a region 601 that is used for compositing operation is ($dx*(l-1)$, 0)–($dx*l$, ($ry1-ry0$)). For that purpose, only the region 601 is written to the frame memory 102 as the intermediate picture images $II_k(l)$ by which the formation of the intermediate picture image of 1 to n−1 at the overlap regions of the picture image I(k) and the picture image I(k+1) is finished. Notation dx designates a width of 1/(n−1) of the width of the overlap region. Thereby, the intermediate picture image $II_k(l)$ shown by FIG. 7E is provided.

When the processing of forming the above-described intermediate picture images at l=1, . . . , n has been finished, the number of frames of the formed intermediate picture images is written to a predetermined address of RAM 112 and the counter k is added with 1. When the counter k is smaller than the number of frames of the picture images, the intermediate picture image processing is carried out with respect to picture images corresponding to the updated counter. When the counter k is equal to the number of frames of picture images, the intermediate picture image forming and processing unit 108 transmits an intermediate picture image forming and processing finish signal to the timing control unit 111 by which the processing is finished.

Upon receiving the finish signal from the intermediate picture image forming and processing unit 108, the timing control unit 111 transmits the start signal to the picture image compositing and processing unit 109 and enters an awaiting state until the timing control unit 111 receives a finish signal from the picture image compositing and processing unit 109.

Upon receiving the start signal from the timing control unit 111, the picture image compositing and processing unit 109 reads and stores the number of frames of picture images to be processed from RAM 112 and sets the counter k to 1. Next, the picture image compositing and processing unit 109 reads from RAM 112 an address in the frame memory 102 of a picture image in correspondence with the counter k and reads the picture image I(k) in the frame memory 102 from the address. When the counter k is 1, the picture image compositing and processing unit 109 writes the picture image I(k) to a predetermined position of an output picture image region in the frame memory 102.

When the counter k is larger than 1, the picture image compositing and processing unit 109 calls from RAM 112 a deviation amount M(k) in respect of a picture image I(k−1). By using the deviation amount, an overlap region $R_k$ in respect of the picture image I(k−1) for (rx0, ry0)–(rx1, ry1), is calculated. Further, the number of frames of intermediate picture images n in respect of the picture image I(k−1) and the picture image I(k) that have been formed at the intermediate picture image forming and processing unit 108, is called from RAM 112. Positions $P_i$ of a composite picture image memory for writing the intermediate picture images $II_k(i)$, i1, . . . , n in the output picture image region, can be calculated by the following equation, $$Pi = \left(\sum_{i=1}^{k} M(i) + rx0 + ((rx1 - rx0)/n) * i,\ ry0\right), i = 1, \ldots, n.$$

Thereby, the intermediate picture images IIk(i), i1, . . . n are copied to the positions $P_i$ of the composite picture image memory in the output picture image region. A portion at the right of x coordinate ry1 of the picture Image I(k) and thereafter is copied to the position ($\Sigma^k_{i=1}$M(i)+rx1, ry1) of the output picture image region. When the above-described processing is finished, the counter k is added with 1, and when the counter k is equal to or smaller than the number of frames of picture image, the above-described processing in respect of the updated picture image I(k) is successively performed. Further, when the counter k is larger than the number of frames of picture image, the picture image compositing finish signal is transmitted to the timing control unit 111 by which the processing is finished.

Upon receiving the finish signal from the picture image compositing and processing unit 109, the timing control unit 111 transmits the start signal to the picture image output processing unit 110 and enters an awaiting state until the timing control unit 111 receives a finish signal from the picture image output processing unit 110.

Upon receiving the start signal from the timing control unit 111, the picture image output processing unit 110 reads from RAM 112 an address of an output picture image in the frame memory 102. Next, the picture image output processing unit 110 transmits a picture image output start signal to the picture image outputting device 103, successively reads the output picture image signal from the frame memory 102 and outputs the signal to the picture image outputting device 103.

When the picture image output processing unit 110 finishes outputting the output picture image from the picture image outputting device 103, the picture image output processing unit 110 transmits a finish signal of the processing to the timing control unit 111 by which the processing is finished.

The timing control unit 111 finishes all the operation when the timing control unit 111 receives the finish signal from the picture image output processing unit 110.

By the above-described flow of a series of processings, difference in the parallaxes between the different images of the object in the overlap regions of the two picture images, is alleviated by forming the intermediate picture images and the finished composite picture image is dispensed with deviation or doubled compositing as in the conventional technology even at portions where the difference in the parallaxes are present. A more natural panoramic picture image can naturally be obtained by increasing the number of forming the intermediate picture images, that is, the number of dividing the overlap region.

Further, according to the present invention, in order to composite the images of the object having different deviation amounts caused by the parallax such that the images are included in the overlap regions W1 and W2 having the same width and a total of widths of the intermediate picture images II(l) through II (n) is equal to the width of the overlap regions W1 and W2, a body proximate to a camera is composited out with a narrow width and a body remote from the camera is composited with a wide width. When the portion proximate to the camera is intended to look natural, in the picture image parallax sampling and processing unit 107, a deviation amount of a body proximate to the camera is determined as a reference value by which the deviation amount of the total is corrected and when a portion remote from camera is intended to look natural, in the picture image parallax sampling and processing unit 107, a body remote from the camera is determined as a reference value by which the deviation amount of the total is corrected.

Further, the embodiment shown here is an example of the invention and the invention is not limited to the content of the embodiment so far as the gist of the invention is not changed.

An explanation will be given of a second embodiment of the invention in reference to the drawings as follows. FIG. 2 is a block diagram showing the electric constitution of a panoramic picture image forming apparatus 100a that is a second embodiment of the invention.

The panoramic picture image forming apparatus 100a includes the picture image inputting device 101, the frame memory 102, the picture image outputting device 103, the picture image input processing unit 104, the picture image preprocessing unit 105, the picture image position calculating unit 106, a picture image parallax sampling and processing unit 107a, a joint line determining and processing unit 108a, a picture image compositing and processing unit 109a, the picture image output processing unit 110, the timing control unit 111 and RAM 112.

An explanation will be omitted with respect to the processings at the picture image input processing unit 104, the picture image preprocessing unit 105 and the picture image position calculating unit 106 since the same processings are performed as in the first embodiment of the invention.

Upon receiving the finish signal from the picture image position calculating unit 106, the timing control unit 111 transmits the start signal to the picture image parallax sampling and processing unit 107a and enters an awaiting state until the timing control unit 111 receives the finish signal from the picture image parallax sampling and processing unit 107a.

Upon receiving the start signal from the timing control unit 111, the picture image parallax sampling and processing unit 107a reads and stores the number of frames of picture images to be processed from RAM 112 and sets the counter k to 1. Next, the picture image parallax sampling and processing unit 107a reads from RAM 112 an address in the frame memory 102 of a picture image in correspondence with the counter k and reads the picture image I(k) in the frame memory 102 from the address. Further, the picture image parallax sampling and processing unit 107a reads the picture image I(k+1) (in correspondence with counter k+1) next to the picture image.

Thereafter, the picture image parallax sampling and processing unit 107a reads from RAM 112 the parallels moved amount calculated at the picture image position calculating unit 106 and respectively calculates the overlap region W1 of the picture image I(k) and the overlap region W2 of the picture image I(k+1).

Further, the picture image parallax sampling and processing unit 107a divides the overlap region W1 of the picture image I(k) and determines the respectives as reference regions and searches corresponding positions from the picture image I(k+1) by using the method of pattern matching. In this case, what is searched is the deviation between the images of the object caused by the parallax and accordingly, the searching operation may be carried out only from the horizontal direction. The deviation amount is an amount of apparent movement of a body caused by the parallax and the amount is caused by the depth and accordingly, the depth of the body in a reference region can be estimated by the direction of deviation and the amount of deviation. Further, when points at a certain depth are made to coincide with each other, even in the overlap region having the same width, due to parallax, the more proximate to a camera from a certain point a body is disposed, the larger the deviation amount to the left side and the more remote from the camera from a certain point a body is disposed, the larger the deviation amount to the right side.

Here, when one of the calculated regions or pixels having a deepest depth, is calculated, that is, when the left direction is made to be positive, the deviation amount of the region having the least deviation amount is subtracted from a distance between the respective regions or pixels and the difference is added to the parallely moved amount calculated at the picture image position calculating unit 106. Thereby, the deviation of the images of the object at a portion having the deepest depth at inside of the picture image, is determined as a reference deviation by which the parallely moved amount in RAM 112 and the respective deviation amounts in the overlap regions are corrected.

In a similar way, the parallax sampling is carried out with the picture image I(k+1) as the reference side and the picture image I(k) as the search side. The result of the parallax sampling of the picture image I(k+1) is similarly corrected and stored to RAM 112.

When the parallax sampling processing of the picture image I(k) and the picture image I(k+1) has been finished, the counter k is added with 1. When the counter k is smaller than the number of frames of picture images, the parallax sampling and processing with respect to the picture image I(k) and the picture image I(k+1) is carried out. When the counter k is equal to or more than the number of frames of picture images, the picture image parallax sampling and processing unit 107a transmits the finish signal to the timing control unit 111 by which the processing is finished.

Upon receiving the finish signal from the picture image parallax sampling and processing unit 107a, the timing control unit 111 transmits the start signal to the joint line determining and processing unit 108a and enters an awaiting state until the timing control unit 111 receives the finish signal from the joint line determining and processing unit 108a.

Upon receiving the start signal from the timing control unit 111, the joint line determining and processing unit 108a reads and stores the number of frames of picture images to be processed from RAM 112 and sets the counter k to 1. Next, the joint line determining and processing unit 108a reads from RAM 112 an address in the frame memory 102 of the picture image I(k) in correspondence with the counter k and reads the picture image I(k) in the frame memory 102 from the address. Further, the joint line determining and processing unit 108a reads the picture image I(k+1) next to the picture image.

Thereafter, the joint line determining and processing unit 108a reads from RAM 112 the deviation amount of images of the object (parallax amount) of the picture image I(k) and the picture image I(k+1) calculated at the picture image parallax sampling and processing unit 107a.

An explanation will be given of a method of calculating a joint line from the picture image I(k) in reference to FIGS. 11A through 11I, 12A, 12B and 13A through 13D.

By the picture image parallax sampling and processing unit 107a, from a parallax picture image (FIG. 1C) in respect of the picture image I(k) calculated from the picture image I(k)(FIG. 11A) and the picture image I(K+1)(FIG. 11B), a point of changing to enlarge further the parallax of the picture image in view from the right end of the picture image, that is, a point satisfying the following Equation is extracted.

$$E(x,y)-E(x1,y) > \text{Threshold}$$

Here, E(x, y) designates a parallax amount or a concentration of a pixel of a parallax picture image at coordinates (x, y) of the picture image and Threshold designates a pertinent threshold value.

Figure 11A:
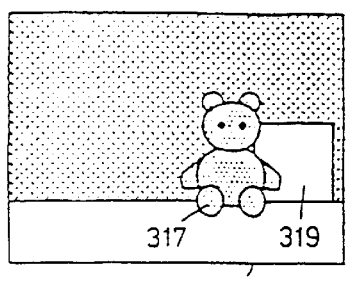
FIGS. 11A through 11I are views showing a flow of processings in forming a panoramic picture image according to the panoramic picture image processing device in the first embodiment of the invention.
Figure 11B:
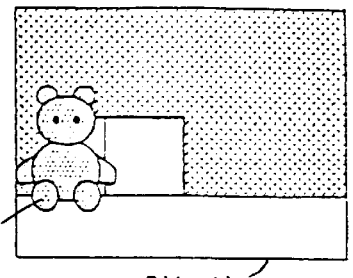
Figure 11C:
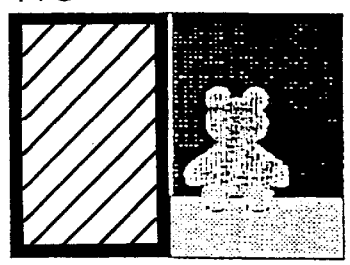
Figure 11D:
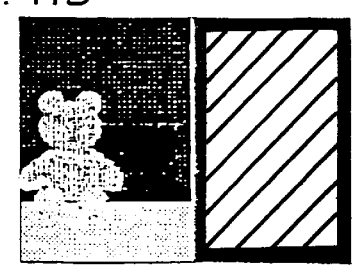
Figure 11E:
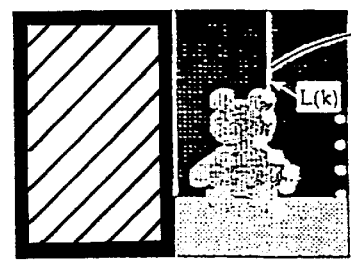
Figure 11F:
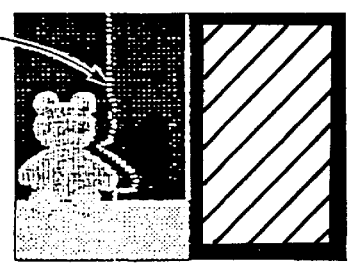
Figure 11G:
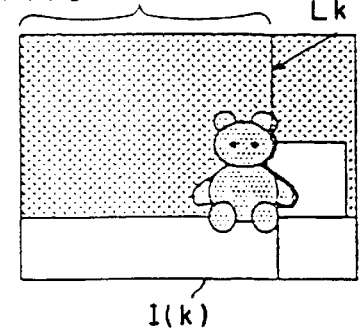

According to the example of FIGS. 11A through 11I, the point is represented by a white circle in FIG. 11E. These points are points on a contour line at the right side of picture images 317 and 319 of the object. The picture images 317 and 319 are arranged horizontally and accordingly, points on the contour lines of the objects 317 and 319 are arranged horizontally among the points.

These point rows designate the contour line on the right side of the images of the object and on the left side of the row of points corresponding to the above-described point rows on the picture image I (k+1), the unseen portion of an invisible portion of the picture image I(k) becomes visible and the difference between the picture images I(k) and I(k+1) becomes significant especially at the left side in the vicinity of these points. Further, the same thing is visible by the both picture images at the vicinity of the right side of these points and accordingly, the difference between the picture images I(k) and I(k+1) become small.

According to a first method of sampling a joint line, in consideration of the above-described situation, points having parallaxes as similar as possible, are sampled from point rows having large calculated change in parallax, that is, the contour line of the same body in the vicinity of the camera is sampled and is determined as the joint line. Further, when there is no portion having the large change in parallax in the up and the down direction as shown in FIG. 11E, a line lowered downwardly from an end of a contour line most proximate thereto to the upper or lower end of the picture image is determined as a joint line.

Figure 12A:
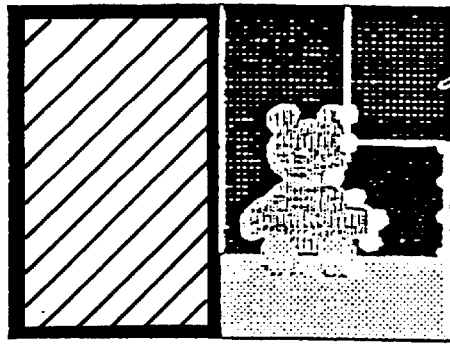
FIGS. 12A and 12B are views showing behavior of determining a joint line by using a second sampling method of a joint line.
Figure 12B:
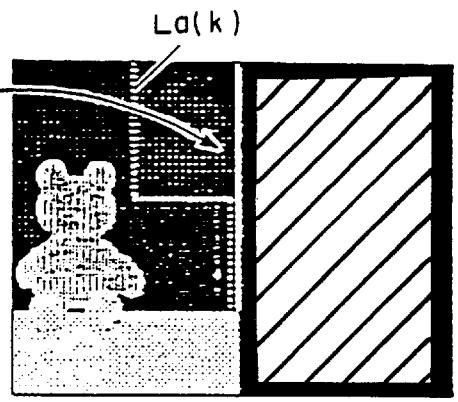

According to a second method of sampling a joint line, a line connecting point rows on the right most side exceeding a certain threshold value "Threshold" in the overlap region among point rows having the large change in parallax that is calculated similar to the first sampling method as shown by FIG. 12A, is determined as a joint line L(k).

Figure 13A:
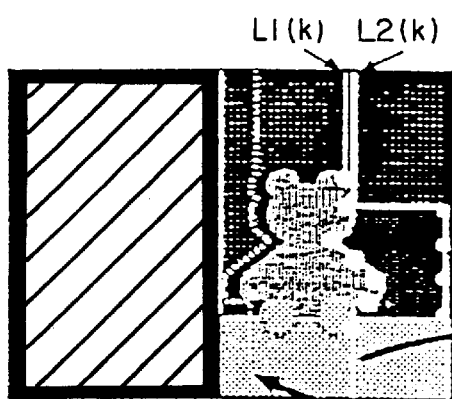
FIGS. 13A through 13D are views showing behavior of determining a joint line by using a third sampling method of a joint line.
Figure 13B:
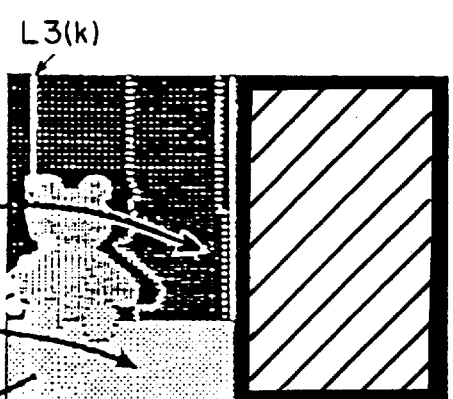

A third sampling method of a joint line is as follows. The first and the second sampling methods of joint line are similarly applicable by calculating point rows having the large change in parallax from left to right with the picture image I (k+1) as a reference. That is, by calculating joint lines from the picture image I(k) and the picture image I(k+1) in accordance with the two methods, a plurality of candidates of joint lines are calculated. Candidates of a plurality of joint lines can further be obtained by changing the value of the threshold value "Threshold". In FIGS. 13A and 13B, candidates of joint lines $L_i(k)$, i1, 2, . . . are represented by white bold lines.

The most pertinent one in the joint line candidates $L_i(k)$, i1, 2, . . . is a joint line minimizing the following value a. The following Equation calculates an integration of a difference in brightness values of points on the joint lines.

$$a = \int_c |L_i(k)(x,y) - L_i'(k)(x',y')|$$

Figure 13C:
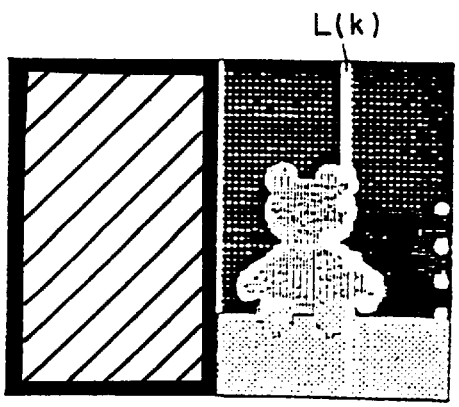
Figure 13D:
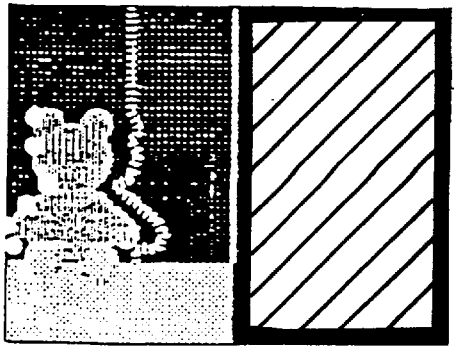

Here, notation C designates paths on the joint lines $L_i(k)$ and $L_i(k)$ (x, y) designates a brightness value at a point (x, y) on a joint line in the picture image I(k) (or a vector of each value of RGB), and $L_i'(k)$ (x', y') designates a brightness value on a point (x', y') on a joint line $L_i(k)$ in the picture image I(k+1) in correspondence with the point (x, y) of the above-mentioned picture image I(k) (or a vector of each value of RBG). A candidate $L_i(k)$ of a joint line minimizing the above Equation is calculated and is determined as the joint line as shown by FIG. 13C.

The above-calculated joint lines L(k) are successively written to predetermined addresses of RAM 112 by which the processing of determining joint lines is finished.

When the processing of determining the joint lines of the picture image I(k) and the picture image I(k+1) has been finished, the counter k is added with 1. When the counter k is smaller than the number of frames of picture images, the processing of determining joint lines in respect of the picture image I(k) and the picture image I(k+1) is performed. When the counter k is equal to or more than the number of frames of picture images, the joint line determining and processing unit 108a transmits the finish signal to the timing control unit 111 by which the processing is finished.

Upon receiving the finish signal from the joint line determining and processing unit 108a, the timing control unit 111 transmits the start signal to the picture image compositing and processing unit 109a and enters an awaiting state until the timing control unit 111 receives the finish signal from the picture image compositing and processing unit 109a.

Upon receiving the start signal from the timing control unit 111, the picture image compositing and processing unit 109a reads and stores the number of frames of picture images to be processed from RAM 112 and sets the counter k to 1. Next, the picture image compositing and processing unit 109a reads from RAM 112 an address in the frame memory 102 of the picture image in correspondence with the counter k and reads the picture image I(k) in the frame memory 102 from the address.

When the counter k is 1, the picture image compositing and processing unit 109a writes the picture image I(k) to a predetermined position in the output picture image region of the frame memory 102.

When the counter k is larger than 1, the picture image compositing and processing unit 109a calls from RAM 112 a parallely moved amount M(k) and a joint line L(k−1) in respect of the picture image I(k−1).

A position $P_k$ for writing the picture image I(k) of the output picture image region, is provided by the following Equation.

$$P_k = \sum_{i=1}^{K} M(i)$$

Further, a joint line is corrected to a position deviated from the original position by $P_{k-1}$.

In copying the picture image I(k) to the output picture image region, the operation is carried out under the following three conditions by which composition of picture images is carried out.

(1) Pixels on the left side of a joint line $L_{k-1}$ are not written.
(2) Components of w dots on the right side of the joint line $L_{k-1}$ are smoothed in respect of the picture image I(k) by concentration smoothing.
(3) Pixels are written as they are at a portion successive to the w dots on the right side of the joint line $L_{k-1}$.

Here, notation w is provided with a pertinent constant value. By carrying out the concentration smoothing by the w dots, the joint looks more naturally.

Figure 11H:
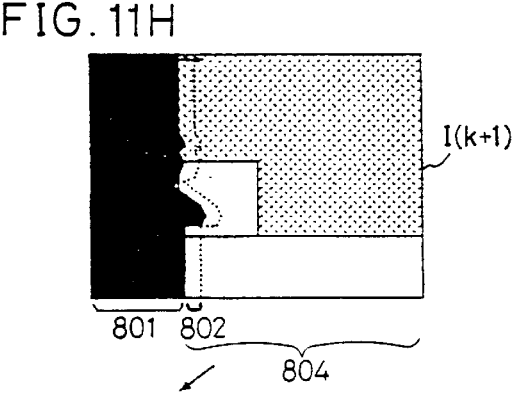
Figure 11I:
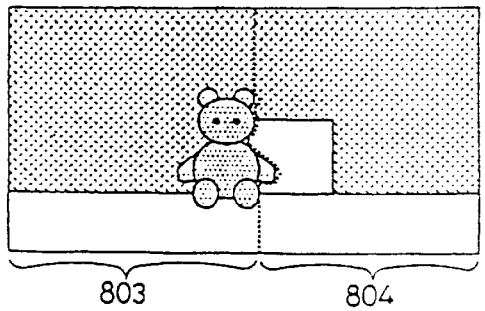

According to the example of FIGS. 11A through 11I, in respect of the processing at the picture image compositing and processing unit 109a, by covering a mask 801 on the picture image I(k+1) as shown by FIG. 11H, pixels on the left side of the joint line $L_{k-1}$ are made to be black pixels. Further, a region 802 comprising components of w dots on the right side of the joint line $L_{k-1}$, is determined as a region for performing concentration smoothing and concentrations of pixels in the region 802 are subjected to concentration smoothing such that, for example, concentrations of pixels in contact with the joint line $L_{k-1}$ are made to be substantially equal to concentrations of pixels in contact with the joint line $L_{k-1}$ of the picture image I(k+1) and concentrations of pixels most remote from the joint line $L_{k-1}$ of the region 802 are substantially equal to original concentration. A portion 804 on the right side of the joint line $L_{k-1}$ of the picture image I(k+1) after performing the processing, is jointed to a portion 803 on the left side of the joint line $L_k$ of the picture image I(k) shown by FIG. 11G. Thereby, a composite picture image shown by FIG. 11I can be provided.

After performing the above-described processings, the counter k is added with 1, and when the counter k is equal to or less than the number of frames of picture image, the above-described processings in respect of an updated picture image I(k) is successively performed. Further, when the counter k is larger than the number of frames of picture images, a picture image compositing finish signal is transmitted to the timing control unit 111 by which the processing is finished. Upon receiving the finish signal from the picture image compositing and processing unit 109a, the timing control unit 111 transmits the start signal to the picture image output processing unit 110 and enters an awaiting state until the timing control unit 111 receives the finish signal from the picture image output processing unit 110.

Upon receiving the start signal from the timing control unit 111, the picture image output processing unit 110 reads from RAM 112 an output picture image address in the frame memory 102. Next, the picture image output processing unit 110 transmits the picture image output start signal to the picture image outputting device 103, successively reads the output picture image signal from the frame memory 102 and outputs the signal to the picture image outputting device 103.

When the picture image output processing unit 110 finishes outputting the output picture image from the picture image outputting device 103, the picture image output processing unit 110 transmits the finish signal of the processing to the timing control unit 111 by which the processing is finished.

Upon receiving the finish signal from the picture image output processing unit 110, the timing control unit 111 finishes all of the operation. Although the more proximate to the camera an object is disposed, the larger the difference in the parallax in the overlap regions of the two frames of the picture images and when the compositing operation is carried out at this point, deviation or doubled imaging may be caused, by providing joint lines on the contour of an object proximate to the camera by the above-described flow of a series of processings, few portions having considerably different parallaxes are jointed and the joint picture image looks more natural than in the conventional technology by which the quality is promoted.

Further, according to the panoramic picture image compositing apparatus 101a of the second embodiment, even when an image of a moving body is included in the picture image, in the operation of sampling parallax, the movement is shown as a parallax and accordingly, high quality jointing can similarly be performed.

The above-described embodiments are examples of embodiments of the invention and the invention is not restricted by the content of the embodiments so far as the gist of the invention is not changed.

According to the panoramic picture image forming apparatuses 100 and 100a of the first and second embodiments, composition of the pair of picture images I(k) and I(k+1) is given as an example. When composition of picture images of three frames or more is carried out by using the panoramic picture image forming apparatuses, the above-described processings may be carried out for each of pairs of picture images including images of the same object and finally all the picture images may be jointed together successively. Further, although the picture images I(k) and I(K+1) provided by pan-imaging are objects of compositing operation, when images of the same object are included in the picture images of the objects of compositing operation, the objects of compositing operation are not limited to picture images provided by pan-imaging but picture images provided by other methods may be used. For example, picture images may be provided by tilt-imaging where a camera is moved in the vertical direction. Further, when imaging ranges are arranged in a matrix and respective imaging ranges overlap portions of other imaging ranges respectively in the horizontal direction and the vertical direction, picture images can be composited respectively in the two horizontal and vertical directions.

Additionally, in order to cause a computer including a central processing unit and a memory to composite a pair of picture images in which images of an object have a parallax, interpolating the parallax, a program which causes the computer to execute the forming and processing of a panoramic picture image as described in the first and second embodiments may be stored in a storage medium capable of being read by the computer. As such storage medium may be used floppy disks, hard disks, magnetic tapes, CD-ROMs, optical disks, photomagnetic disks, minidisks, ROMs, RAMs etc.

A first example of program comprises a series of procedures for causing the central processing unit instead of the units 104 through 111 of the panoramic picture image forming apparatus 100 to execute the processings which are to be executed by the units 104 through 111. The processings are as follows:

to instruct the imaging means to capture divided picture images obtained by overlap of parts of picture images by a plurality of imaging means or by moving imaging means plural times, and instruct storage means to store the divided images captured by the imaging means, under a directed address;

to calculate a position of composition of the divided picture images;

to sample parallax information from a picture image including a parallax within an overlap region between adjacent divided picture images;

to form a plurality of intermediate picture images from the picture images including the parallax within the overlap region; and to form a composite panoramic picture image from the divided picture images.

In the processing of sampling parallax information, the central processing unit executes the operation of correcting deviations of the picture images within the overlap region, and in the processing of compositing the divided picture images, the central processing unit executes the operation of interpolating deviations of the picture images by using the intermediate picture images to form a panoramic picture image.

A second example of program comprises a series of procedures for causing the central processing unit instead of the units 104 through 106, 107a through 109a, 110 and 111 of the panoramic picture image forming apparatus 100a to execute the processings which are to be executed by the units. The processings are as follows:

to instruct the imaging means to capture divided picture images obtained by overlap of parts of imaged picture images by a plurality of imaging means or by moving imaging means plural times, and instruct storage means to store the divided images captured by the imaging means, under a directed address;

to calculate a position of composition of the divided picture images;

to sample parallax information from a picture image including a parallax within an overlap region between adjacent divided picture images;

to set the joint line on the profile of the object closest to the imaging means of the picture image within the overlap region, on the basis of the parallax information; and to form a composite panoramic picture image from the divided picture images.

In the processing of sampling parallax information the central processing unit executes the operation of correcting deviations of the picture images within the overlap region, and in the processing of compositing the divided picture images, the central processing unit executes the operation of joining the divided picture images on the basis of the joint line to form a composite panoramic picture image.

The program stored in the storage medium is installed in the computer to cause the central processing unit to execute the program. In the case of the first example of program, the central processing unit uses a memory as the frame memory 102 and RAM 112, to operate as the unit 104 through 110 as well as the timing controller 111. In the case of the second example of program, the central processing unit uses a memory as the frame memory 102 and RAM 112, to operate sequentially as the unit 104 through 106, 107a through 109a, and 110 as well as the timing controller 111. The computer can thus form a panoramic picture like the first and second embodiments of panoramic picture image forming apparatus 100 and 100a. Accordingly the panoramic picture image forming apparatuses 100 and 100a are realized by the computer.

As described above, the use of the storage medium above-described makes it possible to execute the programs of the invention not only in personal computers but also in various information apparatuses such as mobile information terminals and camera incorporated picture image processing apparatuses.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A picture image forming apparatus comprising:
   imaging means for obtain a pair of divided picture images having a parallax by imaging an object and a periphery of the object so as to include a same part of the object in imaging regions for the pair of divided picture images;
   calculating means for calculating overlap regions of the respective divided picture images including the images of the object,
   parallax sampling means for sampling the parallax from the images of the object in the two overlap regions,
   intermediate picture image forming means for forming intermediate picture images to be provided by imaging the object from points between observing points from which the respective divided picture images are imaged on the basis of the images of the object in the overlap regions of the pair of divided picture images and the sampled parallax, and picture image composition means for providing a composite picture image by interpolating the parallax of the images of the object in the two overlap regions by the intermediate picture images and compositing the pair of divided picture images such that the overlap regions overlap.

2. The picture image forming apparatus of claim 1, wherein, when there are a plurality of objects having different distances from the imaging means to the objects, the parallax sampling means corrects parallaxes of images of the respective objects such that the parallax of the image of any one of the objects among the parallaxes sampled from the images of the respective objects, is nullified.

3. The picture image forming apparatus of claim 1, wherein the intermediate picture image forming means of the picture image forming apparatus forms a plurality of the intermediate picture images and the respective intermediate picture images are provided with observing points different from each other to provide the respective intermediate picture images by imaging the object.

4. The picture image forming apparatus of claim 1, wherein the calculating means of the picture image forming apparatus calculates differences in angle of the images of the object in the two divided picture images and subjects the divided picture images to a rotational transformation such that the calculated differences in angle cancel each other.

5. The picture image forming apparatus of claim 1, wherein the calculating means of the picture image forming apparatus calculates differences in size of the images of the object in the divided picture images and the two divided picture images are magnified or reduced such that the calculated differences in size cancel each other.

6. The picture image forming apparatus of claim 1, wherein the calculating means calculates differences in angle and size of the images of the object in the two divided picture images and subjects the divided picture images to rotational transformation and magnification or reduction such that the calculated differences in angle and size cancel each other, respectively.

7. A picture image forming apparatus comprising:

imaging means for providing a pair of divided picture images having parallaxes in images of objects by imaging the same objects respectively from two different observing points;

calculating means for calculating overlap regions including the images of the objects in the respective divided picture images;

parallax sampling means for sampling the parallaxes from the images of the objects in the overlap regions;

joint line setting means for setting joint lines on a profile of the image of one of the objects most proximate to the imaging means in the respective overlap regions, on the basis of the sampled parallaxes; and picture image composition means for providing a composite picture image by compositing the pair of divided picture images such that the set joint lines overlap.

8. The picture image forming apparatus of claim 7, wherein the joint line setting means of the picture image forming apparatus sets joint lines on a profile most proximate to rims of the divided picture images among the profiles of the images of the objects in the respective overlap regions.

9. The picture image forming apparatus of claim 7, wherein the joint line setting means of the picture image forming apparatus calculates candidates of a plurality of joint lines by using respective different joint line determining methods and one of the candidates of joint lines is selected and determined to be the joint line.

10. The picture image forming apparatus of claim 7, wherein the parallax sampling means corrects the parallaxes of the images of the respective objects such that a least parallax among the parallaxes sampled from the images of the respective objects is nullified.

11. A storage medium capable of being read by a computer, storing a program for allowing the computer to execute the processings of:

inputting a pair of divided picture images having a parallax by imaging an object and a periphery of the object so as to include a same part of the object in predetermined imaging regions;

calculating overlap regions of the respective divided picture images including the images of the object;

sampling the parallax from the images of the object in the two overlap regions;

forming intermediate picture images to be provided by imaging the object from points between the observing points from which the respective divided picture images are imaged on the basis of the images of the object in the overlap regions of the pair of divided picture images and the sampled parallax; and providing a composite picture image by interpolating the parallax of the images of the object in the two overlap regions by the intermediate picture images and compositing the pair of divided picture images such that the overlap regions overlap.

12. A storage medium capable of being read by a computer, storing a program for allowing the computer to execute the processings of:

inputting a pair of divided picture images having parallaxes in images of objects by imaging the same objects respectively from two different observing points, calculating overlap regions including the images of the objects in the respective divided picture images, sampling the parallaxes from the images of the objects in the overlap regions, setting joint lines on a profile of the image of one of the objects most proximate to the observing points in the respective overlap regions based on the sampled parallaxes, and providing a composite picture image by compositing the pair of divided picture images such that the set joint lines overlap.

* * * * *